(12) United States Patent
Cesnik

(10) Patent No.: US 9,787,404 B2
(45) Date of Patent: Oct. 10, 2017

(54) SYSTEM AND METHOD FOR COMMUNICATION OVER COLOR ENCODED LIGHT PATTERNS

(71) Applicant: Clutch Authentication Systems, LLC, Winchester, VA (US)

(72) Inventor: Jeffrey Cesnik, Winchester, VA (US)

(73) Assignee: Clutch Authentication Systems, LLC, Winchester, VA (US)

( * ) Notice: Subject to any disclaimer, the term of this patent is extended or adjusted under 35 U.S.C. 154(b) by 0 days.

(21) Appl. No.: 14/578,331

(22) Filed: Dec. 19, 2014

(65) Prior Publication Data

US 2015/0104187 A1    Apr. 16, 2015

Related U.S. Application Data

(63) Continuation-in-part of application No. 14/028,380, filed on Sep. 16, 2013.

(51) Int. Cl.
| | |
|---|---|
| *H04B 10/00* | (2013.01) |
| *H04B 10/516* | (2013.01) |
| *H04B 10/67* | (2013.01) |
| *H04L 9/32* | (2006.01) |
| *H04N 21/44* | (2011.01) |
| *H04N 21/45* | (2011.01) |
| *H04N 21/81* | (2011.01) |
| *H04N 21/8358* | (2011.01) |

(52) U.S. Cl.
CPC .......... *H04B 10/516* (2013.01); *H04B 10/67* (2013.01); *H04L 9/3271* (2013.01); *H04N 21/44008* (2013.01); *H04N 21/4508* (2013.01); *H04N 21/812* (2013.01); *H04N 21/8358* (2013.01)

(58) Field of Classification Search
CPC ..................................................... H04B 10/116
See application file for complete search history.

(56) References Cited

U.S. PATENT DOCUMENTS

| | | | | |
|---|---|---|---|---|
| 2,635,140 | A * | 4/1953 | Dome ....................... | H04J 1/04 348/473 |
| 4,743,960 | A * | 5/1988 | Duvic ....................... | H04N 9/64 348/660 |
| 4,799,677 | A * | 1/1989 | Frederiksen ............ | A63F 13/00 345/555 |
| 5,361,261 | A * | 11/1994 | Edem ....................... | H04L 12/44 341/102 |
| 5,818,032 | A * | 10/1998 | Sun ................... | G06K 19/06037 235/469 |
| 6,722,567 | B2 * | 4/2004 | Shaked ..................... | G06K 7/14 235/462.01 |
| 7,020,327 | B2 * | 3/2006 | Tack-don ........... | G06K 19/06037 235/469 |

(Continued)

OTHER PUBLICATIONS

TCS3414 EVM User's Guide TAOS, Rev 1.0, undated.

(Continued)

*Primary Examiner* — Danny Leung
(74) *Attorney, Agent, or Firm* — Da Vinci's Notebook, LLC

(57) ABSTRACT

The present invention includes a light communication method and system wherein messages are transmitted via color code flashes. The light communication includes mechanisms for oversampling the color code flashes to enhance the accuracy of the method and system.

10 Claims, 20 Drawing Sheets

(56) References Cited

U.S. PATENT DOCUMENTS

| | | | | |
|---|---|---|---|---|
| 7,093,298 B2* | 8/2006 | Rodriquez | G06F 21/31 | 713/167 |
| 7,370,200 B2* | 5/2008 | Kindberg | G06F 21/445 | 380/247 |
| 7,689,130 B2* | 3/2010 | Ashdown | H04B 10/1141 | 398/118 |
| 7,698,556 B2* | 4/2010 | Zhang | H04L 63/12 | 380/258 |
| 7,738,711 B2* | 6/2010 | Kondo | G06T 1/0028 | 382/232 |
| 7,840,028 B2* | 11/2010 | Simske | G06K 9/2054 | 382/100 |
| 8,165,472 B2* | 4/2012 | Takene | H04B 10/1141 | 398/172 |
| 8,433,203 B2* | 4/2013 | Yokoi | H04B 10/116 | 398/118 |
| 8,521,035 B2* | 8/2013 | Knapp | H04L 12/43 | 315/158 |
| 8,594,510 B2* | 11/2013 | Schenk | H05B 37/02 | 315/152 |
| 8,620,163 B1* | 12/2013 | Sleator | H04B 10/116 | 348/116 |
| 8,634,725 B2* | 1/2014 | Jang | H04B 10/116 | 398/118 |
| 8,811,825 B2* | 8/2014 | Walewski | H04B 10/1141 | 398/140 |
| 9,020,338 B2* | 4/2015 | Walewski | H04B 10/114 | 398/158 |
| 2001/0049804 A1* | 12/2001 | Arai | H03M 13/2909 | 714/712 |
| 2003/0035580 A1* | 2/2003 | Wang | G06K 9/325 | 382/176 |
| 2003/0065918 A1* | 4/2003 | Willey | H04L 63/0492 | 713/168 |
| 2003/0066890 A1* | 4/2003 | Shaked | G06K 7/10722 | 235/462.01 |
| 2003/0112471 A1* | 6/2003 | Damera-Venkata | G06K 19/06028 | 358/3.28 |
| 2004/0200904 A1* | 10/2004 | Pinson | G06K 19/06037 | 235/494 |
| 2007/0297612 A1* | 12/2007 | Feder | H04L 9/065 | 380/270 |
| 2008/0170863 A1* | 7/2008 | Won | H04B 10/116 | 398/172 |
| 2008/0309259 A1* | 12/2008 | Snijder | H05B 37/029 | 315/312 |
| 2009/0256922 A1* | 10/2009 | Gersten | H04N 5/4401 | 348/222.1 |
| 2009/0324248 A1* | 12/2009 | Shiraki | H04B 10/116 | 398/172 |
| 2010/0254712 A1* | 10/2010 | Linnartz | H04B 10/116 | 398/172 |
| 2011/0069960 A1* | 3/2011 | Knapp | H04L 12/43 | 398/103 |
| 2011/0200338 A1* | 8/2011 | Yokoi | H04B 10/116 | 398/158 |
| 2011/0273468 A1* | 11/2011 | Chong | B44D 3/003 | 345/593 |
| 2012/0062607 A1* | 3/2012 | Erinjippurath | G09G 3/3413 | 345/690 |
| 2012/0308229 A1* | 12/2012 | Bahr | H04B 10/116 | 398/25 |
| 2013/0272717 A1* | 10/2013 | Deguchi | H04B 10/116 | 398/154 |
| 2014/0178080 A1* | 6/2014 | Chen | H04B 10/116 | 398/172 |
| 2015/0082034 A1* | 3/2015 | Cesnik | H04N 21/44008 | 713/168 |
| 2015/0104183 A1* | 4/2015 | Jeffrey | H04L 9/3271 | 398/130 |
| 2015/0104184 A1* | 4/2015 | Jeffrey | H04L 9/3271 | 398/130 |
| 2015/0104187 A1* | 4/2015 | Jeffrey | H04L 9/3271 | 398/140 |
| 2015/0155937 A1* | 6/2015 | Jeffrey | H04B 10/116 | 340/815.4 |
| 2015/0155938 A1* | 6/2015 | Jeffrey | H04B 10/116 | 340/815.4 |
| 2015/0156186 A1* | 6/2015 | Jeffrey | H04L 63/08 | 713/168 |
| 2015/0215312 A1* | 7/2015 | Cesnik | H04L 9/3271 | 726/9 |
| 2015/0256522 A1* | 9/2015 | Jeffrey | H04L 63/0442 | 713/168 |

OTHER PUBLICATIONS

"Sensing color with the TAOS TCS230", TAOS, May 17, 2005.
TCS3404, TCS3414 Digital Color Sensors, Product Catalog, Apr. 2011.
"Trends in CMOS Image Sensor Technology and Design", by Abbas El Gamal, Department of Electrical Engineering; Stanford University, last updated Jul. 9, 2003.
http://www.taosinc.com/productdetails.aspx?ID=121, TAOS website.
http://www.rsa.com/node.aspx?id=1156, RSA website.
http://www.rsa.com/node.aspx?id=1158, RSA SecurID product web page.

* cited by examiner

924

| Binary Sequence Correlation Table | | | |
|---|---|---|---|
| Binary Sequence | Red Channel | Green Channel | Blue Channel |
| 0000000 | 5 | 11 | 17 |
| 1000000 | 35 | 5 | 0 |
| 0100000 | 119 | 59 | 29 |
| 1100000 | 125 | 59 | 29 |
| 0010000 | 5 | 5 | 125 |
| - | - | - | - |
| - | - | - | - |
| - | - | - | - |
| - | - | - | - |
| - | - | - | - |
| - | - | - | - |
| - | - | - | - |
| - | - | - | - |
| - | - | - | - |
| - | - | - | - |
| - | - | - | - |
| - | - | - | - |
| - | - | - | - |
| - | - | - | - |
| - | - | - | - |
| 1111111 | 179 | 11 | 35 |

382

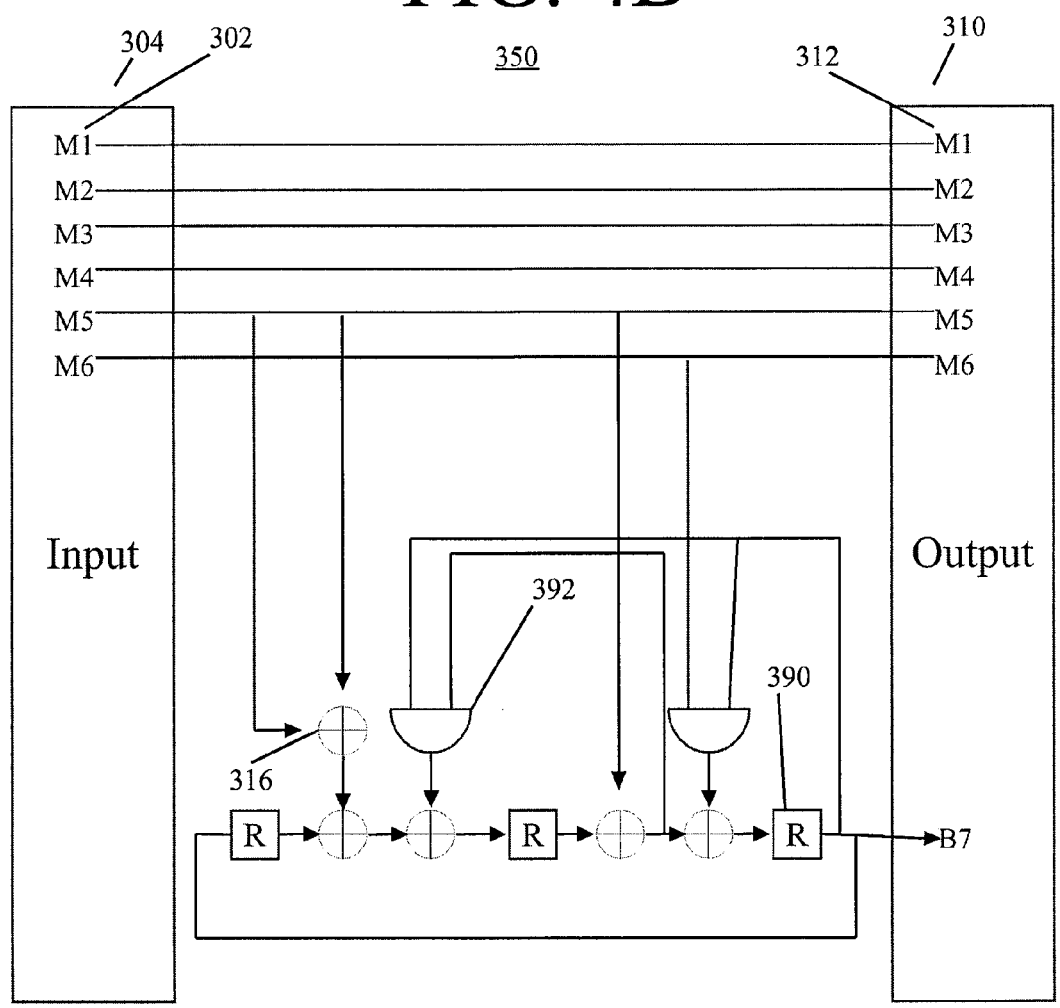

FIG. 13
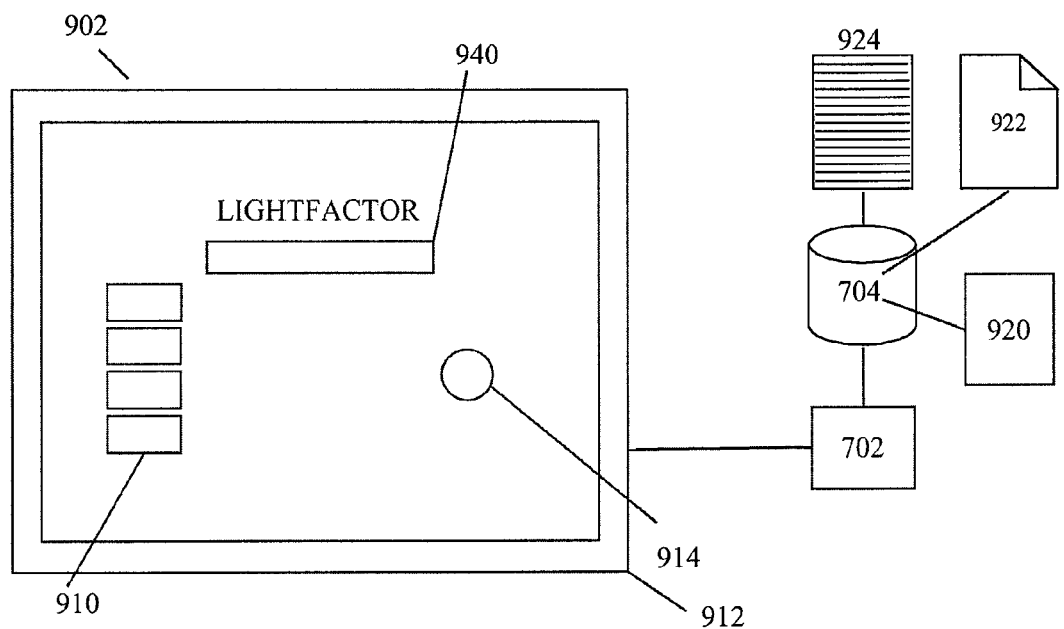
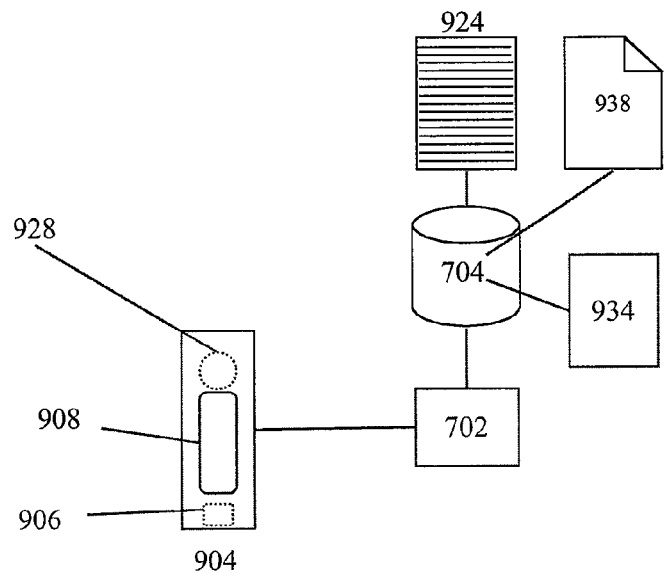

SYSTEM AND METHOD FOR COMMUNICATION OVER COLOR ENCODED LIGHT PATTERNS

RELATED APPLICATIONS

This application is a continuation-in-part of, and claims priority under 35 U.S.C. §120 from, U.S. patent application Ser. No. 14/028,380, filed Sep. 16, 2013, the disclosure of which is incorporated herein by reference, which in turn is a continuation of, and claims benefit from, U.S. patent application Ser. No. 13/216,433 filed Aug. 24, 2011 the disclosure of which is incorporated herein by reference.

FIELD OF THE INVENTION

The present invention relates to the field of secure information transmission and more specifically to the field of color-encoded communications.

BACKGROUND

In the 1920's, a series of experiments were conducted on human sight that led to the specification of what is called the CIE xyz color space. This color space contains all perceivable colors (or gamut) that the human eye can detect. Most computer monitors, televisions and other similar devices use and RGB (red/green/blue) color space model, which is a subset of the CIE xyz color space due to the fact that these devices cannot recreate every possible human perceptible color. By combining different values of three primary colors (red, green, and blue), any color within the RGB color space gamut can be created. Not to be overlooked, white is the combination of all three primary colors and black is the absence of any color.

Most electronic displays in use today represent color with 8 bits of precision; that is, the intensity of each color channel (red, green, or blue) can be represented as an 8-bit number (0-255 decimal, or 0x00-0xFF hex). A modern electronic display is capable of producing on the order of 16.7 million distinct colors using this method.

In order to transmit data through a display device, the sequential presentation of colors representing encoded data must be presented as a "video" color stream, or alternatively, presented via dedicated software to mimic a "video" color stream—at a frame rate that can be reproduced reliably on a given display device. The refresh rate of a given display device will dictate the highest achievable video frame rate, with 60 Hz being a common baseline on desktop computer displays. 15-30 frames per second (or more) video can be reliably displayed on such devices, meaning that raw data transfer rates on the order of a few tens to a few hundred bits per second could be achieved assuming a data encoding density of 3 to 8 bits per distinct color. By increasing either or both data encoding density and number of frames displayed per second, the data transfer rate can be increased accordingly.

Many different electronic sensors are capable of detecting colors, and most work off of the same principle—a photo-sensitive device behind one or more color filters. For example, an imaging sensor that you would find in a digital camera consists of thousands (or millions) of pixels, with each individual pixel being behind a red, green, or blue color filter. By counting the number of photons hitting the sensor over a given period of time (integration), a relative digital count of each red, green and blue pixel can be ascertained—the combination of which would yield a digital representation of the sensed color.

Other than common multi-pixel imaging sensors, there also exists a class of device which is basically a dedicated "single-pixel" color sensor; that is, a sensor that is only able to detect a single color at a time. These sensors typically use an array of photo-sensitive elements, each with a corresponding red, green, or blue (and sometimes also clear) color filter—the output of such sensors is a digital count representing the overall illumination of each color channel. An example of such a sensor is the TCS3414 digital color sensor manufactured by Austria Micro Systems (AMS). Similar sensors are also manufactured by Hamamatsu and Avago Technologies as well as others. They are generally available in very small packages (approximately 2 mm.times.2 mm square) and at very low price points (a few dollars each). These sensors are used in industry for a number of purposes including monitor backlight color temperature monitoring/correction, industrial process control, instrumentation (colorimeters), consumer toys, etc.

Most electronic sensors described above do not respond equally to a given primary (red, green or blue) color. The exhibited unequal channel response, together with potential inconsistent repeatability and overall sensitivity characteristics can create challenges if such single pixel sensors were to be used to sense and decode a stream of encoded "video" color stream data. Additionally, inconsistencies between display devices (display technology, spectral response, brightness, contrast, gamma response, etc.) further complicate matters. What is needed is a novel method considering such challenges inherent in the color sensor and the transmitting display that will allow the sensor to operate at relatively high frequencies of 15-30 frames per second (or more) to decode a single-color "video" color stream, and effectively to become a single-pixel "video camera".

In recent years, much of the research and development in the communications industry has been concentrated in the area of digital signal transmission. As is well known in the art, digital signal transmission typically involves transmission of data with a carrier frequency. The carrier frequency is modulated by data so that a frequency bandwidth is occupied by the transmitted signal. The growing demand for access to data and communication services has placed a significant strain on the available bandwidth in traditional channels. Moreover, there is an ever increasing demand for increased data communication rates for the purpose of decreasing the data transmission time. An increase of the rate of the data typically results in an increased bandwidth requirement, placing a further strain upon the available bandwidth for transmission of signals. In the case of this invention, there is no true "carrier" to modulate on top of—the changing sequence of colors themselves (the color stream) becomes an embedded "clock".

In an effort to increase the data rates without sacrificing the available bandwidth, a number of increasingly sophisticated coded modulation schemes have been developed. For example, quadrature amplitude modulation (QAM), traditionally implemented over RF or audio channels, employs both amplitude and phase modulation in order to encode more data within a given frequency bandwidth. Another modulation technique involves multiple phase shift keying (MPSK) to increase data capacity within a given bandwidth. These high level modulation schemes are very sensitive to channel impairments. That is, the information encoded by means of such techniques is often lost during transmission due to noise, Rayleigh fading and other factors which are introduced over the communication medium.

In order to compensate for the increased sensitivity of these high level modulation schemes, various forward error correction coding techniques have been employed. One such error coding technique is trellis coded modulation (or TCM). Trellis coded modulation is desirable since it combines both coding and modulation operations to provide effective error control without sacrificing power and bandwidth efficiency. Furthermore, it has been shown that trellis coded modulation schemes perform significantly better than their un-coded equivalents with the same power and bandwidth efficiency. Trellis codes have been developed for many of the high-level, high-rate modulation schemes, including well-known 8-PSK modulation and Square 16 QAM modulation in addition to others.

SUMMARY

The present invention includes a light-based communication method and system for the color-coded transmission of a message. The system includes a transmitter for emitting a color stream communication representing underlying data that is detected and translated by a receiver. The transmitter is initialized to transmit the color stream transmission composed of data converted into original code color triplets selected from stock code color triplets within a predefined color gamut. The color stream transmission may be further modified according to one of the embodiments of the present invention.

In a calibration embodiment of the present invention, the color stream transmission includes a calibration array of original calibration color triplets representative of volumetric extents of code color triplet channels. In a framing embodiment of the present invention, calibration color triplets segment the color stream transmission into logically divisible frame components. In an error-correcting embodiment of the present invention, convolutional coding is applied to binary data, which is then mapped to code colors for subsequent transmission. In a multiple transmission embodiment of the present invention, the calibration array is a transmission element distinct from the transmission element that transmits the data transmission element.

The transmitter transmits the color stream transmission, which is then received on a receiver that is distinct from the transmitter. The receiver includes a sensor adapted to interpret color flashes as received color triplets. It is preferred that the receiver has a priori environmental knowledge of any calibration colors, particularly those that may be used in framing. At least one embodiment of the present invention utilizes oversampling of the color stream transmission by linearly cascading constituents of the sensor such that the sensor is able to fractionally sample available colors as flashed.

A correction calculation includes a gamut calibration derived from normalizing the calibration color triplets based on a multidimensional difference between the received color triplets and original color triplets of any calibration array. When a gamma calculation is desired to be included in the correction calculation, a plot of each of triplet channel may be partitioned by use of intermediate color triplets or other means, including a priori knowledge thereof or use of a database of values for comparable transmitters. Gamma correction values are used to substantially equalize spacing between stock colors as received by the receiver.

Rather than rely on a premise that color flashes can be understood as received, the present invention attempts to approximate code colors as transmitted by plotting received code color triplets, after application of said correction calibration, as multidimensional plot points. A nearest neighbor plot point is sought from a multidimensional plot of stock code color triplet points representative of a binary string. In an error code embodiment, the multidimensional plot may use planes of co-sets that lack an adjacent plot point neighbor. Data is extracted from the color stream transmission by translating the binary strings corresponding to the code colors to a translated data bit sequence.

Preferred uses of the present invention include anonymous communication over a network and validation of commercial transactions. In the anonymous communication embodiment, the receiver is pre-loaded with one or more private keys associated with one or more public keys. Messages may be encrypted with the public key, received with the receiver, and then decrypted pursuant to the private key. In the commercial transaction embodiment of the present invention, the data of the color stream transmission includes a validation key converted into original code color triplets selected from stock code color triplets. When alphanumeric information is displayed on a client computer from a server computer (e.g., a bank), a user of the client computer can validate the server computer's authenticity by translating color code flashes with the receiver, and optionally, inputting the validation key to the client computer.

These aspects of the invention are not meant to be exclusive. Furthermore, some features may apply to certain versions of the invention, but not others. Other features, aspects, and advantages of the present invention will be readily apparent to those of ordinary skill in the art when read in conjunction with the following description, and accompanying drawings.

BRIEF DESCRIPTION OF THE DRAWINGS

FIGS. 4A and 4B are views of a simplified forward error correction system of the present invention, and a preferred forward error correction system of the present invention, respectively.

FIG. 13 is a view of a preferred system of the present invention.

DETAILED DESCRIPTION

Figure 1:
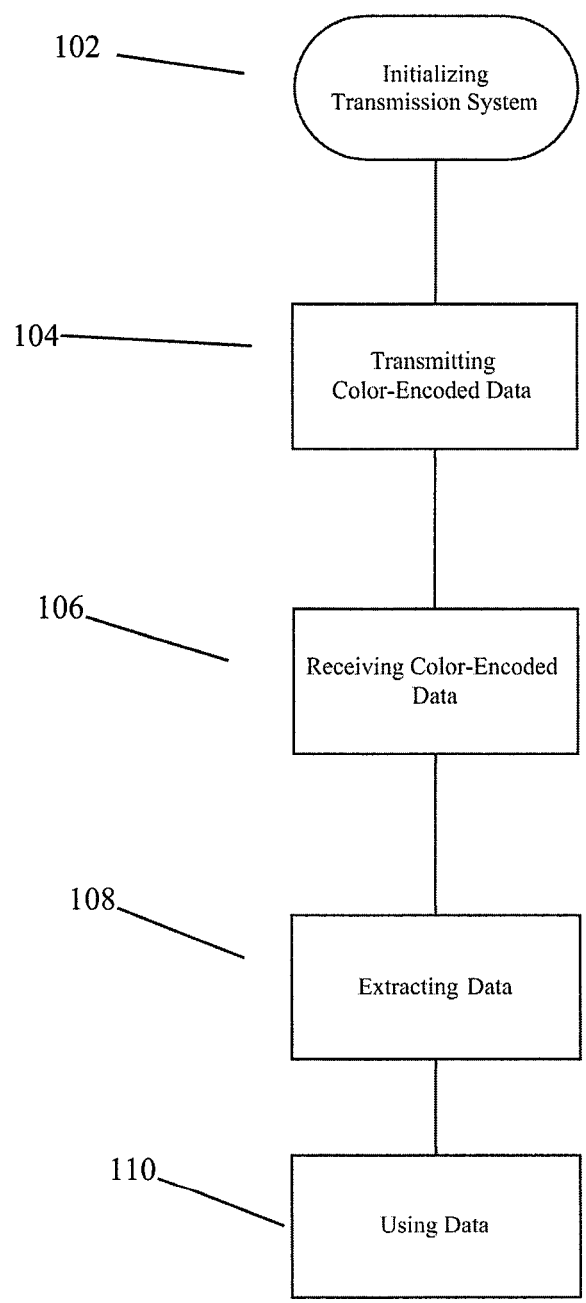
FIG. 1 is a view of the process of the present invention.

The present invention permits data to be securely transmitted and received as a color-coded transmission stream. Referring first to FIG. 1, a generalized embodiment of the color-coded transmission process 100 is shown. The process 100 includes the steps of initializing 102 the transmission system for encoding data, transmitting 104 color-encoded data as a color stream, receiving 106 the color stream, extracting 108 the underlying data of the color stream, and using 110 the data. Initializing 102 the transmission system includes the sub-steps related to preparing data for transmission as an encoded color stream.

Figure 2:
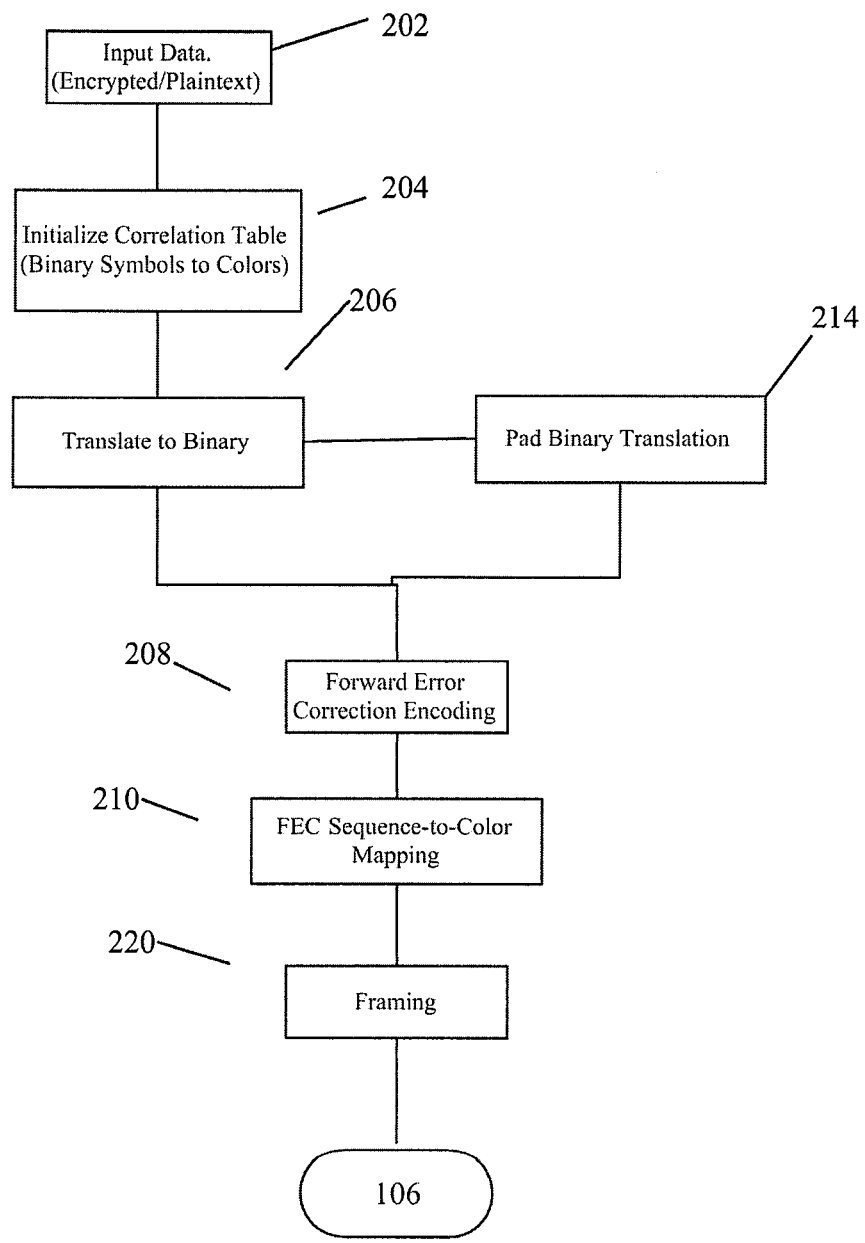
FIG. 2 is a view of a preferred initializing step of the present invention.
Figure 3:
FIG. 3 is a view of a correlation table of the present invention.

Turning now to FIG. 2, the initializing step 102 includes inputting 202 data desired to be transmitted as an encoded color stream. The data may include any content capable of representation in binary format. Examples of information include audio, visual, and character symbols, (e.g. alphanumeric and ASCII symbols). Then, as is shown in FIGS. 2-3, a correlation table 924 is initialized 204. Initialization of the correlation table may include populating a correlation table, accessing a pre-existing correlation, or otherwise making ready a correlation table. The correlation table of the present invention includes a series of related values associating color attributes with binary values. The preferred color set quantity of the present invention is a power of two, and more preferably 128 colors. The preferred binary value set quantity of the present invention is a 7-bit value, which is matched to the 128 colors of the preferred color set. The correlation table may associate the binary values, also referred to herein as binary strings, to colors, or to attributes of colors. The preferred color attributes of the present invention includes Red-Green-Blue values (hereinafter, "RGB values"), however, other means of characterizing colors may be used, such as cyan-magenta-yellow-black, hue-saturation-lightness, hue-saturation-value, etc. The set of possible colors available for use as a code color is referred to as "stock" code colors herein.

Message data is then translated 206 into one or more binary values derived from the binary values representative of the data concatenated. By translating, it is meant that the data desired to be the subject of a secure transmission of the present invention is replaced by a digital binary string. As will be discussed later in this disclosure, the preferred invention sends burst transmissions or frames of encoded light sequences as a color stream wherein each color corresponds to a uniform binary length. By "burst transmission" it is meant the transmission of one entity, e.g. a color, to be representative of many entities, e.g. bits. As the binary string resulting from the translation 206 may not be evenly divisible by the uniform binary length, it is preferred that the digital binary string is padded 214 to be a multiple of the non-error corrected input that results in the uniform binary length output. The digital string should be padded with additional "spare" and inert bits to create a binary string that is a multiple of six in the present invention. These padded bits should be understood by the system and process of the present invention to not be representative of underlying data, in other words, inert. Because the preferred color encoding of the present invention includes color flashes that correspond to a uniform binary length of seven bits, which are derived from the process of error encoding six bits of binary data, the preferred padding 214 will pad the digital binary string to a multiple of six. For example a digital binary data string of one thousand two hundred and four bits may be padded to a length of one thousand two hundred and six bits. The digital string may be directly derived from the data or may be derived through an intermediate encryption routine, which is a part of the translation step.

Figure 4A:
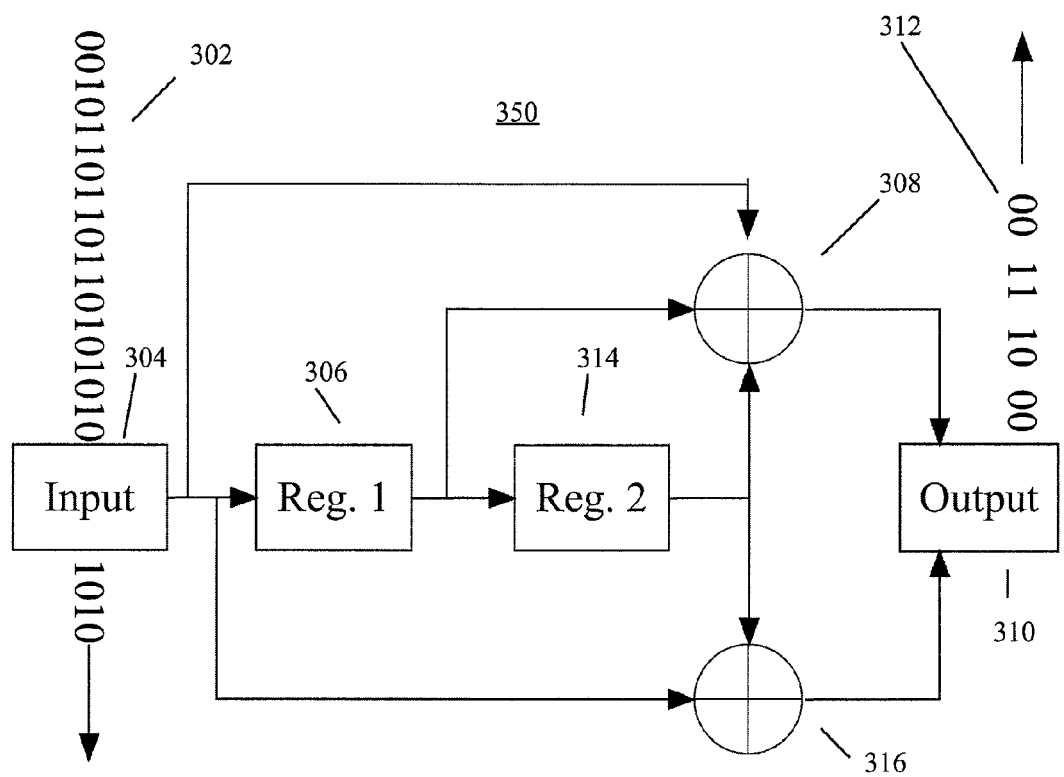
Figure 5:
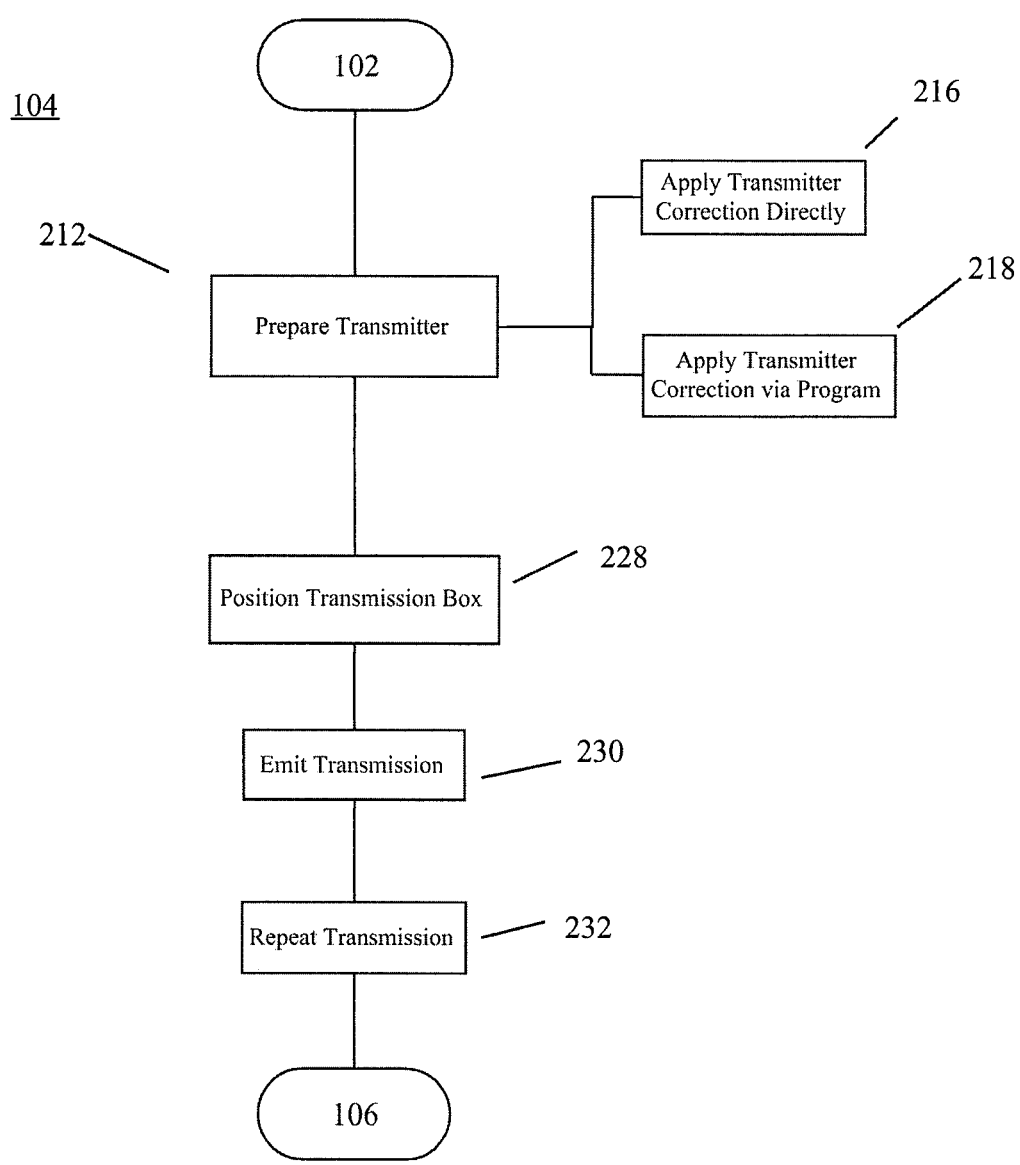
FIG. 5 is a view of a preferred transmitting step of the present invention.

As is shown by FIGS. 2, 4A, and 4B, the data may be encoded 208 into a forward error correction code string adapted for transmission. To minimize the effects of noise as well as other channel impairments, one or more error encoding techniques are used in order to provide for accurate transmission and detection of data, especially when very high level modulation schemes are employed. Unlike prior uses of forward error correction code, the coding is multi-dimensional in nature and not directly applied to the entity transmitted (here, the color), but rather the entity (here, binary values) underlying the transmitted entity. Convolutional coding is a forward error correction coding technique that is designed and optimized according to a specific modulation scheme. A convolutional encoder encodes information symbols based upon the present input symbol and the state of the encoder. The present state of the encoder is determined by the bits which previously entered the encoder. That is, the encoded symbol is a function of the present input symbol and also symbols that entered the encoder before the present input symbol. A convolutional encoder has memory. Convolutional codes are typically implemented by shift registers and logic gates (e.g., XOR gates). The output of the encoder is a function of the present state of the input and the value of the bits presently stored within the registers.

FIG. 4A illustrates an exemplary embodiment of a convolutional encoder 350 implemented by means of shift registers, XOR gates and the input state of the binary string. The encoder 350 is shown here in order to illustrate a simplified implementation of a convolutional encoder of the present invention. The encoder 350 includes an input register 304 shift register memory units 306, 314 as well as XOR gates 308, 316. A one-bit input from the digital string 302 is encoded into a two-bit output 312 to provide a rate ½ encoding.

In this encoder, data bits are provided at a rate of k bits per second. Channel symbols are output at a rate of n=2 k symbols per second. The input bit is stable during the encoder cycle. The encoder cycle starts when an input clock edge occurs. When the input clock edge occurs, the output of the left register 306 is clocked into the right register 314, the previous contents of the input 304 are clocked into the left register 306, and a new input bit becomes available to the input 304. Then the outputs of the upper and lower modulo-two adders become stable. The output cycles through two states: in the first state, it selects and outputs the output of the upper XOR gate 308; in the second state, it selects and outputs the output of the lower XOR gate 316.

Assume that the outputs of both shift registers are initially cleared; i.e. their outputs are zeroes. The first clock cycle makes the first input bit, a zero, available to the encoder. The register outputs are both zeroes for the encoded digital string 312. The inputs to the XOR gates, 308, 316 are all zeroes, so the output of the encoder is 00.

The second clock cycle makes the second bit available to the encoder. The left-hand register 306 clocks in the previous bit, which was a zero, and the right-hand register clocks in the zero output by the left-hand register. The inputs to the top XOR gate are 100, so the output is a one. The inputs to the bottom XOR gate are 10, so the output is also a one. So the encoder outputs 11 to the encoded digital string 312.

The third clock cycle makes the third bit, a zero, available to the encoder. The left-hand register clocks in the previous bit, which was a one, and the right-hand register clocks in the zero from two bit-times ago. The inputs to the top XOR gate are 010, so the output is a one. The inputs to the bottom XOR gate are 00, so the output is zero. So the encoder outputs 10 to the encoded digital string 312. The nature of the rate 1/2, K=3 convolutional encoder is that each input bit has an effect on three successive pairs of output symbols. That is an extremely important point and that is what gives the convolutional code its error-correcting power. Such an error-correction encoding scheme will be applicable when one bit of data is coded 208 into two bits of coded data, which in turn is represented by a color corresponding to the two bits of coded data. The preferred embodiment of the present invention, however, utilizes a six/seven rather than a one/two convolutional coding scheme. The present invention is not meant to be restricted to any particular means of forward error correction.

The preferred means of forward error correction, which is for six/seven coding, is depicted in FIG. 4B. Here, the bit sequence is divided into multiples of six bits 302 (M1, M2, M3, M4, M5, M6) for parallel encoding, rather than the one/two serial encoding described in FIG. 4A. The forward error coded output 310 seven bit sequence 312 derived from the input 304 six bit sequence 302 includes six informational bits along with one error correction bit. In reviewing the input bits 302, the bits are depicted from most significant bit, M1, to least significant bit, M6. M1 to M6 do not undergo alteration and are passed unfiltered to the output. A seventh bit, B7, is generated which serves a purely error correcting function. The preferred formulation is as depicted in FIG. 4B and includes XOR gates 316, state registers 390, and AND logic gates 392. The coded bit string M1, M2, M3, M4, M5, M6, and B7 is then correlated to a color 210.

After the digital input string has been encoded to form (an optionally padded) digital binary string, the output of encoded seven bit sequences are mapped 210 to code color "symbols" to form a sequence of transmission code colors based on the color correlation table 924 such as is shown in FIG. 3. For example, a binary string of eighty-four bits may be formed into a color stream transmission sequence of twelve colors from the color correlation table. As another example, the encoded bit sequence of Ser. No. 00/010, 101110101010110 may be matched, simplistically, to the colors green: blue: magenta, which is how underlying data might be represented at the present point in the transmission process.

Figure 8A:
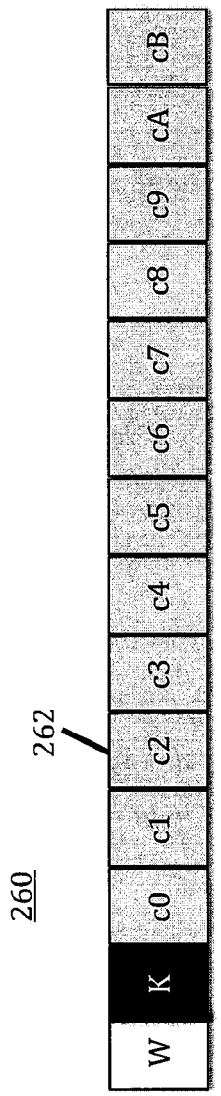
FIGS. 8A-8B is a view of a preferred frame structure of the present invention.
Figure 8B:
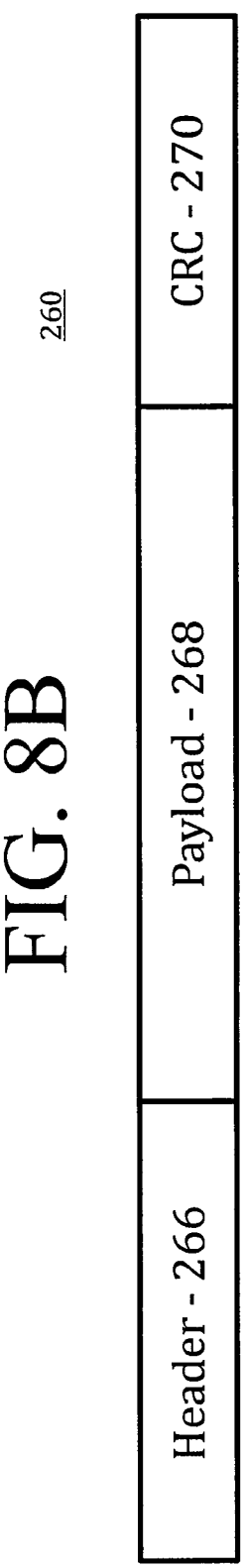
Figure 8C:
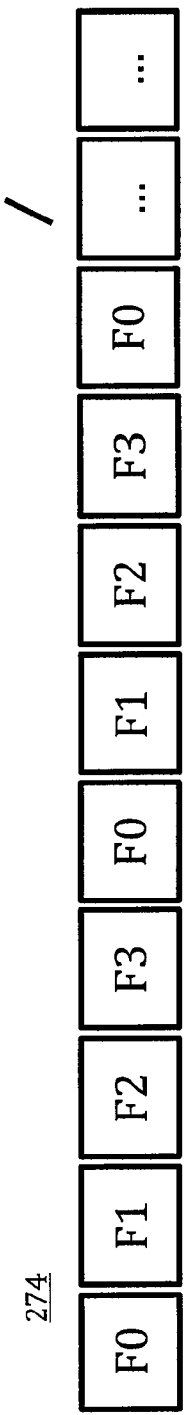
FIG. 8C is a view of a multi-frame color stream transmission of the present invention.

As shown in FIG. 2 with further reference to FIG. 8A-8C, a code color sequence representative of the data—as previously encoded, padded, and translated—is created. The present invention then forms the message communication into its color stream transmission form 274 by framing 220 color components 262 of the encoded color sequence into one or more "frames" 260. Framing relates to the problem of locating the beginning and end of data elements. Data elements of the frame include logical subdivisions of the code color stream, wherein the frame may be divided into a header 266, payload 268, cyclic redundancy check data 270, and others. Those portions of the frame related to validation of the transmission, as opposed to a precursor for translation from binary to data or a means for calibrating a component used in the transmission of the color stream, may be referred to as a validation sequence. A simple version of the frame 260 may include merely the code colors, c0, c1, c2, etc. 262 along with a white, w, or black, k, calibration colors. A code color includes those colors that are translatable from a color to a binary value or string to reconstruct the underlying data of the transmission; a calibration color includes those colors utilized to calibrate a component used in the transmission of the color stream. As will be discussed later, it is preferred that the present invention regularly sample white and black colors during the color stream transmission, as well as sample the "corners" of an RGB, or other triplet, parallelepiped; however, all of these elements may not be present in each frame. The use of white, black, triplet corners, or other reserved colors may be used to identify frame attributes (such as frame type, meaning, specific interpretation of the frame contents, etc.). FIG. 8A is an example of a single frame, where c0 . . . cB represents each color within the "color stream" sequence of the frame. FIG. 8B shows the contents of a single example frame, from a purely data perspective (above the symbol level). FIG. 8C is an example of a complete message transmission, comprised of multiple frames (F0 . . . F3) repeating indefinitely.

The checksum or cyclic redundancy check data 270 (which may be forward error corrected) helps ensure the integrity of the delivered data payload. The cyclic redundancy data may be a direct function of one or more colors, or indirectly as the binary data that the colors represent. The checksums and/or CRCs are computed on the contents of the message payload and/or the message header. As discussed elsewhere in this disclosure, white and black symbols may be used for scale/offset calibration as well as for framing purposes.

As the "white" symbol is comprised of full intensity Red, Green, Blue values (RGB=255,255,255) when displayed by a display device (or "transmitter"), this will always be sampled as the highest relative digital counts to the other transmitted symbols as it represents the highest possible luminance within the signal. Conversely, the "black" symbol (RGB=0, 0, 0) will always be sampled as the lowest relative digital counts to the other transmitted symbols. Therefore, the "white" color may be used as a frame delimiter or start-of-frame marker (or contrariwise, the black symbol could be used to delimit frames). Given that the sensor of the receiver may also have a "clear" channel, this channel may be used to detect the highest or lowest overall luminance transmitted within a sequence (which will naturally correspond to white/black). This saves several real-time math operations in practice, simplifying the framing process and allowing the ready identification of frame boundaries with very little computational work.

Additionally, the nature of black and white color symbols permits detection on a basis other than their chromatic characteristics. Color flashes may be understood by the present invention in multiple ways, including by chromatic characteristics, sequence position, luminescence, or according to any other means known in the art. These multiple bases of detection are referred to herein as the environmental characteristics of the color.

A black symbol may be transmitted periodically, preferably once per frame, to allow each frame to be calibrated in terms of scale/offset individually. Since the white symbol may conveniently serve the purpose to permit detection of frame boundaries by itself, the location of the black symbol in the frame sequence could be arbitrary; therefore, it is possible to vary the location of the black symbol and use this to encode an additional piece of contextual information (or additional data bits) per frame. Contrariwise, detection of frames bounded by black symbols renders arbitrary the location of the white symbol within a frame sequence; therefore the white symbol may be used to encode an additional piece of contextual information (or additional data bits) per frame. As an example, suppose several different types of frames were queued for transmission, the location of the black symbol (or white depending on chosen frame delimiters) within the frame could be used to denote these different types of frames (e.g. —frame type one would have a black position=2, frame type two would have a black position=3, etc.). Note that this idea could also be extended to use any of the reserved non-data-carrying protocol overhead symbols (including gamut "calibration" symbols discussed elsewhere) to encode contextual information. It is also entirely possible to combine these ideas—using the order, location, or existence of a black, white, or other non-data carrying symbol to encode different frame types, additional data bits, and other extraneous contextual information or attributes simultaneously.

The header 266 is presently designed to convey information about the number of frames to expect to receive, as well as which frame number is currently being received. This is important, given that the present invention desires to reduce the amount of time it takes to transmit and receive an entire message transmission. Considering that all frames comprising a message transmission are preferably repeated sequentially, the header information allows the receiver (which may not have started receiving at the beginning of a message transmission) to piece together the contents (frames) of a message received in any order.

Although the present invention describes simple point-to-point communications, the invention may be further expanded to include routed color stream communications and as such include the header classes (as encoded color stream data elements) similar to IPv4 or IPv6, including version, total length, identification flags, fragment offset, time-to-live, protocol, header checksum, source identifier, and destination identifier. Each frame 260 of a complete message color stream transmission 274 is concatenated together to form the entire message transmission color stream. As is shown in FIG. 8C, it is preferred that the message transmission color stream is repeated.

Figure 20:
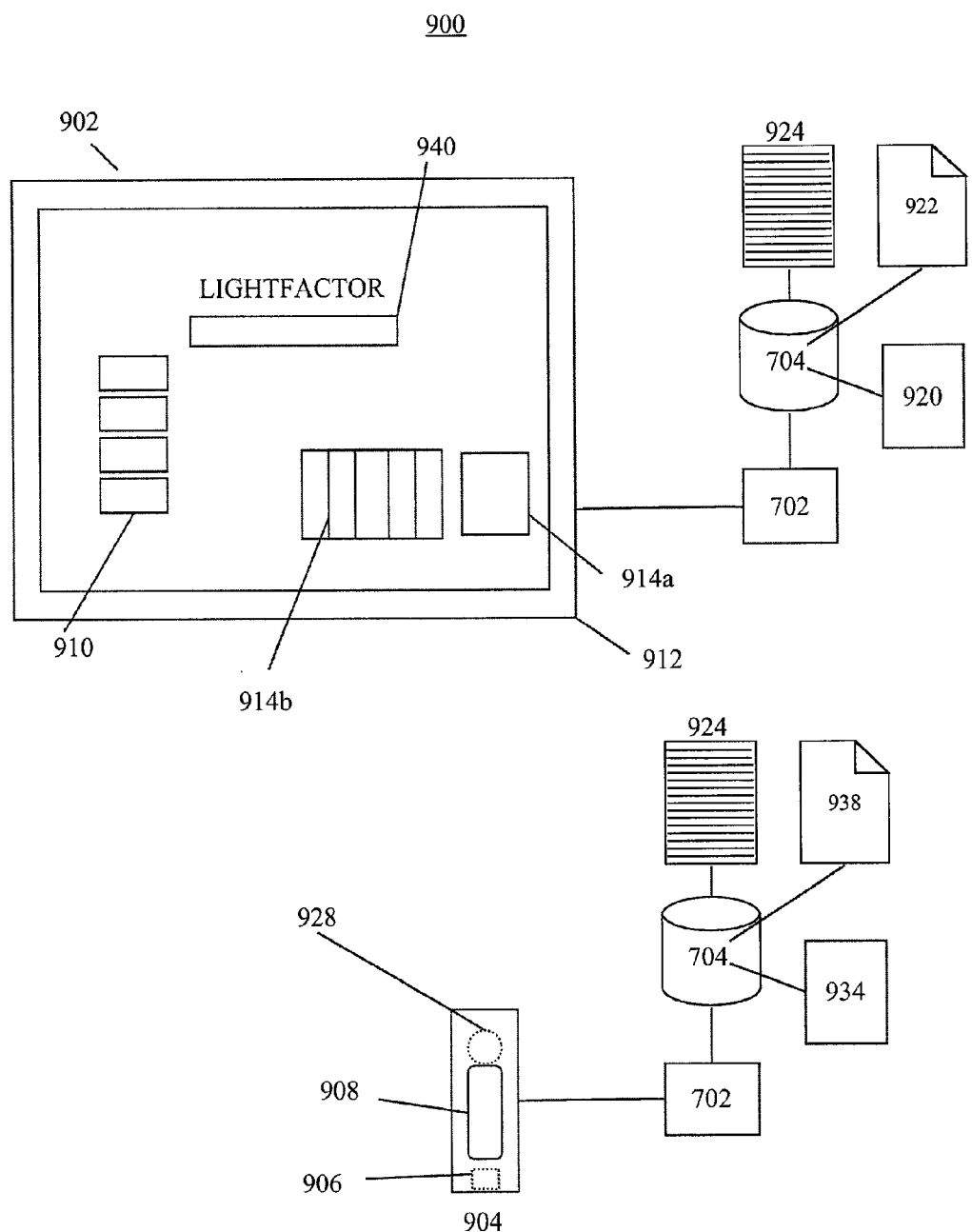
FIG. 20 is a view of a preferred system of the present invention.

Returning to FIG. 2, with reference to FIGS. 13 and 20, the system 900 of the present invention includes a transmitter 902 and a receiver 904. The preferred mechanism for transmitting a message communication includes a Graphical User Interface ("GUI") 912 specific to the system. The ideal GUI may include a web page or native application that can be personalized on a use-by-use basis. The web page or native application may be divided into a submission portal and a transmission web page. The submission portal may accept the data input 202 of the process of the present invention, preferably through a secured connection (such as https). The transmission URI implements the transmission step 104 and may be accessible by password or otherwise be publicly available.

Figure 14:
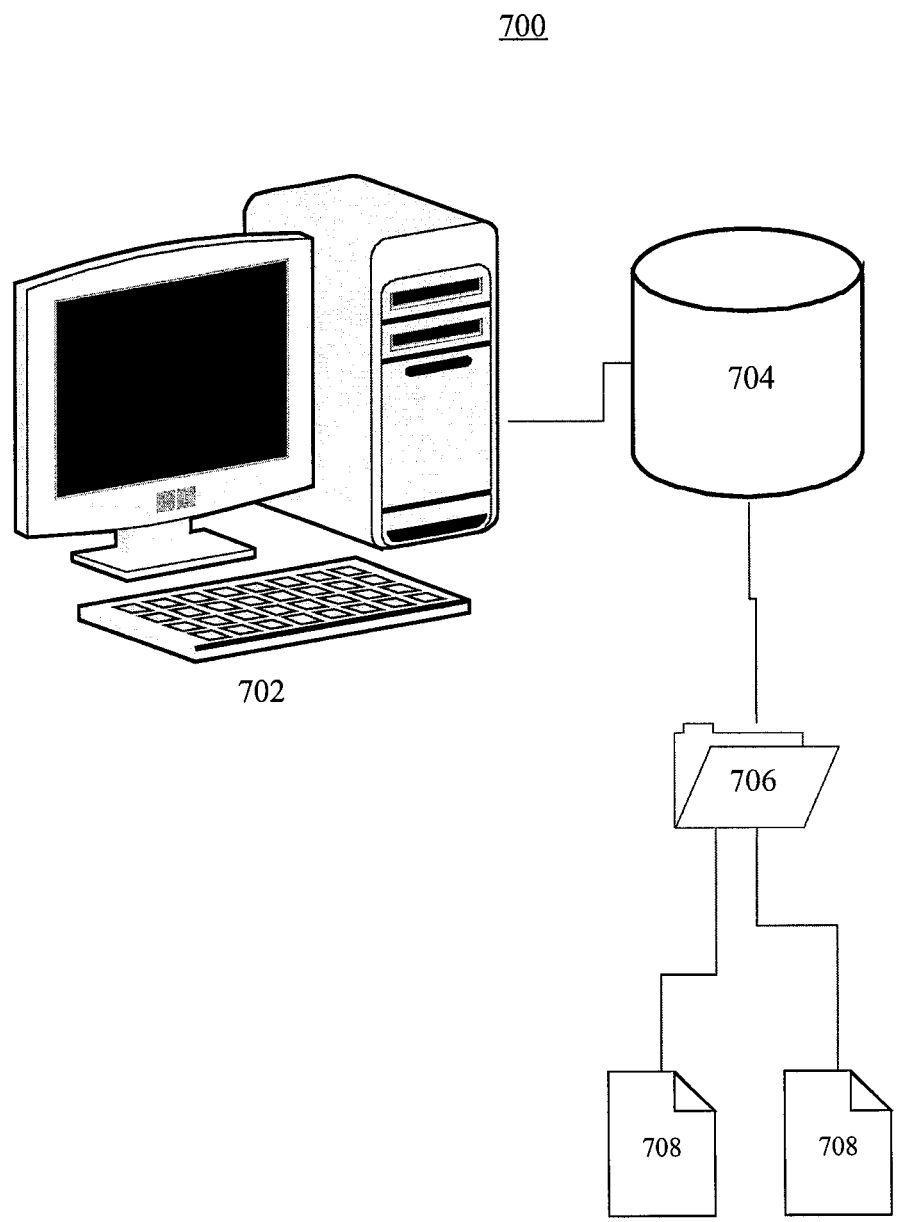
FIG. 14 is a view of a computing ecosystem of the present invention.
Figure 15:
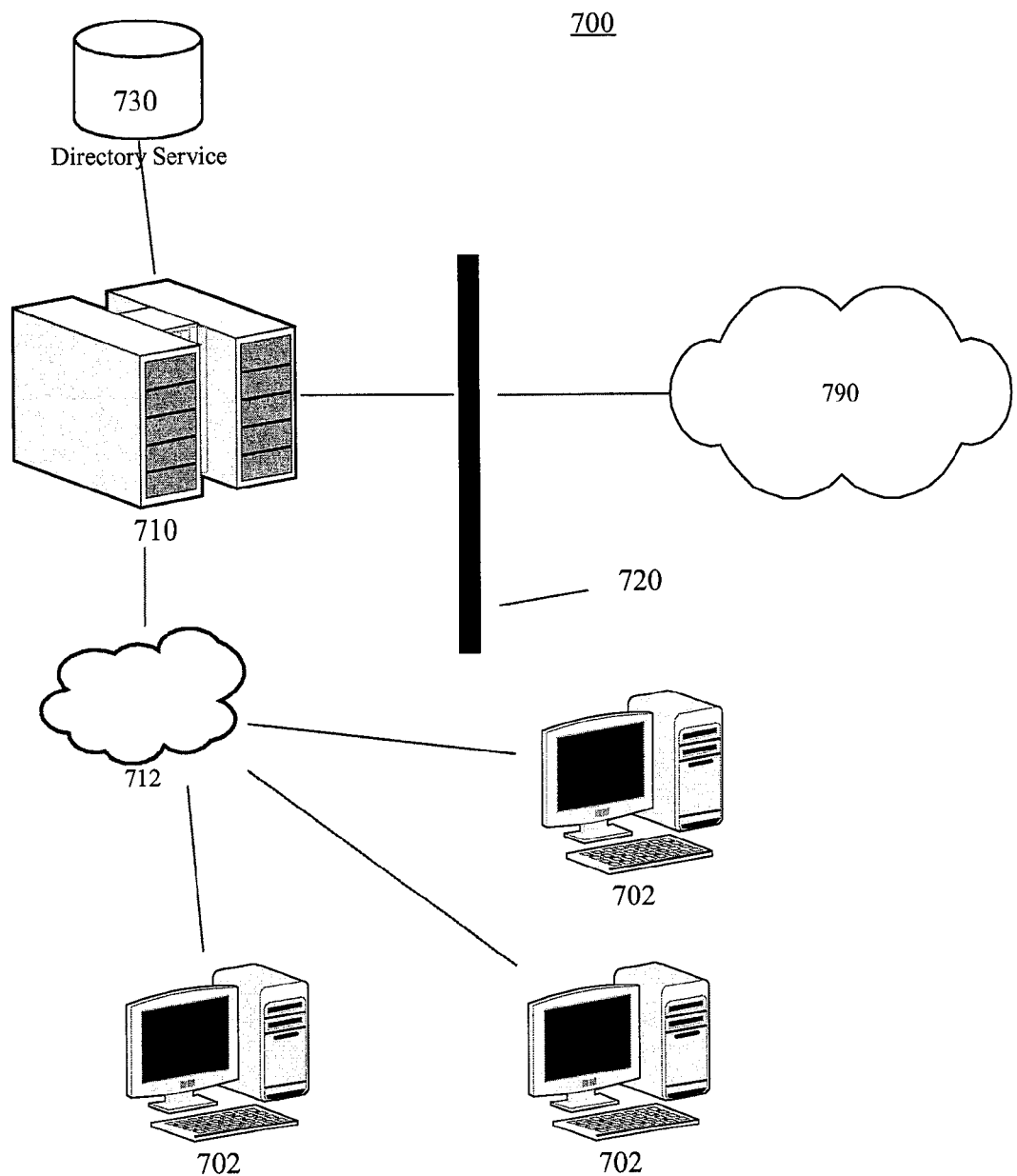
FIG. 15 is a view of a computing ecosystem of the present invention.
Figure 16:
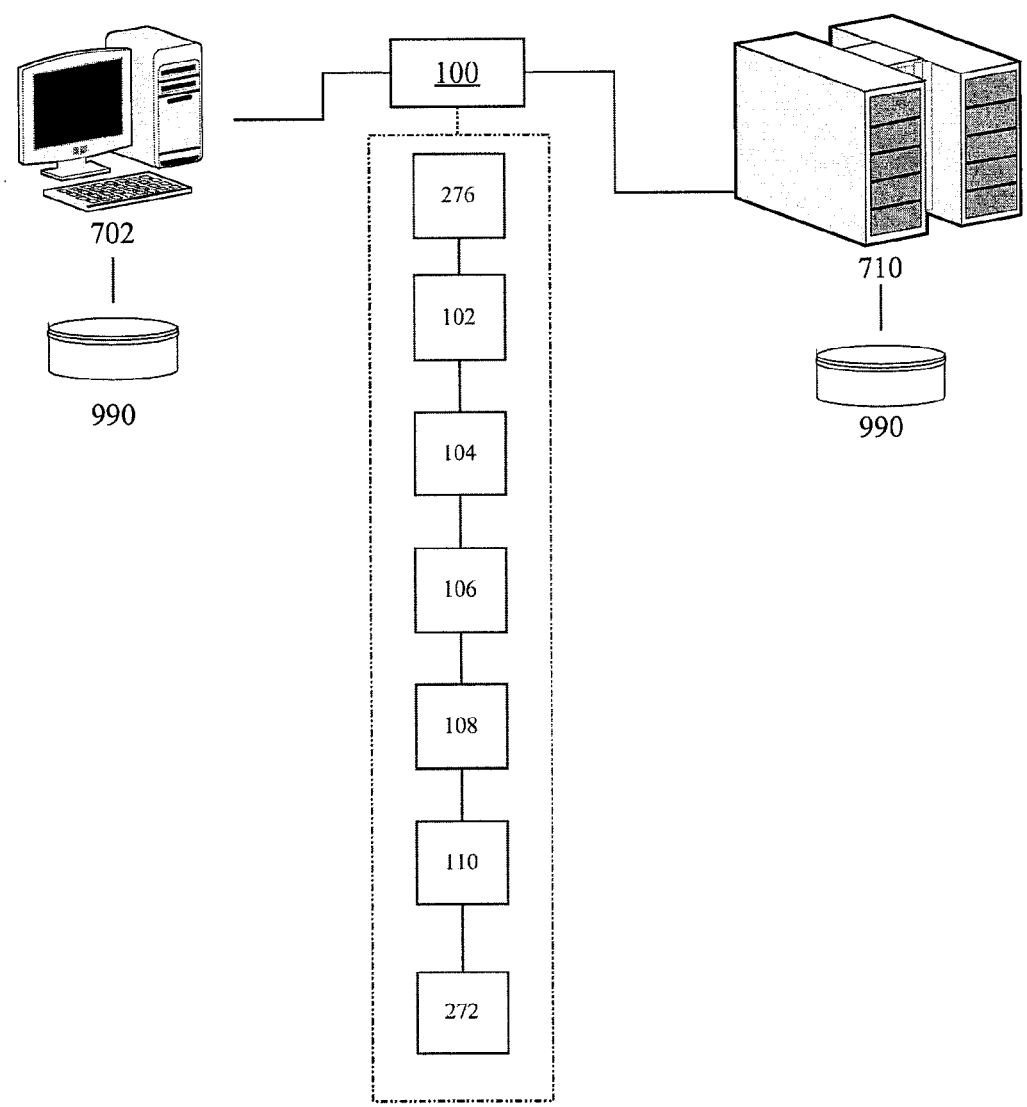
FIG. 16 is a view of a preferred commercial validation version of the present invention.

The present invention may rely on memory and computer elements for implementation. FIGS. 14-15 depict a computer ecosystem 700 of the present invention. By ecosystem it is meant one or more computers 702 that are organizationally related. The ecosystem may include computers under common ownership, computers that belong to the same network or series of networks, computers that are collaborating, etc. The present invention may be provided as a computer program product, or software that may include a computer-readable storage medium 704 having stored thereon instructions, which may be used to perform the process of the present invention across a computer ecosystem 700 according to the various embodiments disclosed herein.

A computer 702 of the present invention may include any combination of one or more computer readable media 704. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium 704 may be any tangible medium that can contain, or store a program for use by or in connection with an instruction execution system, apparatus, or device.

A computer readable signal medium 704 may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures described below illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Furthermore, the functionality of one block may be subsumed by the functionality of another block as a substep thereof. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

An ecosystem 700 may further include a computer network or data network that allows computers to exchange data. In a computer network of the present invention, networked computing devices pass data to each other along data connections. The connections between nodes are established using cable media, wireless media, or other media. The Internet or other exterior network 790 may be a component of the ecosystem 700. Nodes may include hosts such as personal computers, phones, servers, and networking hardware. Two such devices are networked together when one device is able to exchange information with the other device, whether or not they have a direct connection to each other. Computer networks of the present invention support applications such as access to the World Wide Web, shared use of application and storage servers, printers, and fax machines, and use of email and instant messaging applications. Computer networks may be included irrespective of the physical media used to transmit their signals, the communications protocols to organize network traffic, the network's size, topology, and organizational intent.

It is preferred that the network of the present invention have at least one boundary 720, and potentially multiple boundaries if a demilitarized zone is utilized. The boundary 720 may include any number of layers designed to regulate and secure the flow of information between networks. Boundary layers of the present invention may include enterprise content management software, firewalls, filters, threat management software, alarms, etc. Software for establishing a boundary may be run on a server 710 with server storage 730 of the present invention, which may include directory services controlling access credentials.

To combat security risks posed by network connections, firewalls are frequently used. A firewall may be a hardware or software component that filters network traffic so that communications with unauthorized third parties are blocked but legitimate network functions may be carried out. Frequently, the filters applied by a firewall are specified by a set of policies defining characteristics of network messages that either should pass through the firewall or that should be blocked. Because different levels of communication may be appropriate depending on the origin or destination of messages, firewall policies may be provided for each application that executes on a computing device and communicates over a network.

A firewall may have an outward side facing a global network, such as the Internet. The opposite side of the firewall may be a private network that is protected by the firewall. The private network may include any number of host machines (e.g., computers) each addressable by its own IP address. The physical construction of the network may be such that all data packets intended for one of the IP addresses behind the firewall pass through the firewall. Using the firewall rules, which may be set by a network administrator or other user, the firewall may determine whether to allow or deny certain data packets and/or determine where to route particular data packets based on the IP addresses to which the packets are directed. The determination of where to route data packets may be done using the IP addresses of the host machines in the private network.

Depending on the addressing scheme used by the network, the IP addresses of the host machines may be static or dynamic. Static IP addresses do not change over time, and thus once they are set in the firewall rules, there is no need to update them. The Internet Protocol version Four (IPv4) addressing system commonly uses static addressing, while IPv6 may use dynamic addressing. Dynamic IP addresses may change over time and thus, there is a need to update the firewall rules as changes occur. When a small Local Area Network (LAN), such as a domestic network in a private residence, is linked to a larger network such as the Internet, the link is often through a gateway router acting as a firewall. One of the functions of the firewall is to protect the LAN from intrusion from outside.

A service directory accessible by a server 710, usually on server storage 730, stores information about network resources across a domain. An example of a directory service is Active Directory. The main purpose of Active Directory is to provide central authentication and authorization services for Windows-based computers. Active Directory also allows administrators to assign policies, deploy software, and apply critical updates to an organization. Active Directory stores information and settings in a central database.

An Active Directory structure is a hierarchical framework of objects. The objects fall into three broad categories: resources (e.g. printers), services (e.g. e-mail) and users (e.g., user accounts and groups). The Active Directory provides information on the objects, organizes the objects, controls access and sets security. Certain objects can also be containers of other objects. An object is uniquely identified by its name and has a set of attributes—the characteristics and information that the object can contain—defined by a schema, which also determines the kind of objects that can be stored in the Active Directory.

Typically, the highest object in the hierarchy is the domain. The domain can be further sub-divided into containers called Organizational Units. Organizational units give a semblance of structure to the organization either based on administrative structure or geographical structure. The organizational unit is the common level at which to apply group policies, which are Active Directory objects themselves called Group Policy Objects. Policies can also be applied to individual objects or attributes as well as at the site level (i.e., one or more IP subnets).

The present invention may use one of more communication networks to foster information exchange throughout the computers of the ecosystem. Communication networks might either be private or public. In a private network, communications between multiple computers occur in a secure environment that prevents access from outside the network without appropriate authentication. These networks are considered as "trusted" networks because the communication signals securely travel from one computer to another within the private network without being exposed to the external environment.

Public networks such as the Internet, on the other hand, are not secure because the communication over these networks is not private and is susceptible to interception by other computers. In addition, the public networks cannot guarantee the delivery of the data packets being sent. They allow packets to be injected into, or ejected out of, the networks indiscriminately, and analyzed while in transit. To keep data sent over a public network private, a Virtual Private Network (VPN) is commonly established on top of a public network when two computers use the public network to communicate with each other. In a Virtual Private Network, data sent from one computer to another is encrypted by a security gateway and transmitted in encrypted form over the public network to a second security gateway connected to the receiving computer. The second gateway decrypts the data before forwarding it to the receiving computer. Such a private channel established on top of another network is referred to as a network tunnel.

In order to set up a Virtual Private Network, a user first establishes a path to a VPN server and goes through an AAA process (Authentication, Authorization and Accounting) for identification and authorization to create a secure tunnel with the server. Once the user is authorized, a secure network tunnel is established between the user and the VPN server over the public network, using a VPN protocol such as IPsec. This process requires a VPN client on the user's side, a VPN server and other VPN hardware on the other side of the tunnel, as well as appropriate user configurations.

Today's private networks often include wireless networks such as WiMAX to accommodate mobile access. In addition, to provide mobility access in a large geographic area, a private enterprise often relies on third-party wireless infrastructures besides its own wireless network. In this case, a user's device would need to be authenticated by both a third-party gateway and an enterprise authentication server before it could access the enterprise network. User credentials are typically requested by and securely returned to the third-party gateway. Once the user is authenticated and authorized, the user may communicate with the third-party wireless gateway.

The present invention includes files 708, which may include executable instructions by which the present invention runs, or files upon and with which the present invention interacts. The documents may be on local storage 704 or shared storage 730 and be created, accessed, edited, and/or otherwise modified using any of a number of applications, including for example and without limitation Final Cut Pro, Avid, Microsoft Office applications (Word, Excel, Power Point, Outlook, Visio, etc.), Adobe Reader or Acrobat, AutoCAD, SolidWorks, or any other suitable document editing application. The content of the documents may be audio tracks, video clips, images, word processing documents, presentations, spreadsheets, business documents, engineering documents, databases, etc.

As shown by FIGS. 1, 2, 5, 13, and 20 the transmitter 902 transmits 104 the color stream transmission. One of the complexities of color communication ameliorated by the present invention is the generalized application of color communications to a wide variety of transmitter transmission screens. Transmission screens may include CRT monitors, LED, LCD, Plasma, surface projections, and other forms of visual and non-visual graphic display known in the art. Color CRTs are usually constructed with three electron guns which direct electron beams respectively at red, green, and blue phosphors located on the viewing screen. A problem arises in that, as a result of the manufacturing process, some non-uniformity results from insufficient levels of cleanliness or irregularities in the size of the phosphor dots and possibly in aperture masks used therewith. There results a non-uniformity in display which, while possibly being acceptable for day-to-day situations, is excessively troublesome where accurate presentation of standardized colors is required.

LED video screens are made up of individual panels having a predetermined number and arrangement of controllable LEDs. The panels and/or modules are mounted next to each other and their outputs are controlled such that they appear to be one large display screen. Unfortunately, LEDs are known for decaying over time. This means that the LEDs will not be as bright and/or as colorful as they were prior to their first use. Thus, after monthly and yearly operation of an LED video screen, the LEDs on the panels, modules, etc. that make-up the screen will eventually decay, affecting the brightness and/or color of the screen. Depending upon how the LED video screen was being used and what it had been displaying, the decay level of the LEDs on the individual panels and modules may be different from panel to panel and module to module. That is, because some LEDs will be used more frequently than others depending upon e.g., their location and what the screen was being used to display, uniformity of the screen (particularly with respect to its brightness and color output) will get worse over time.

Although prior methods of color and gamma correction attempt to solve color discrepancies globally (i.e. —at the transmitter screen level), the present invention further solves screen color discrepancies for the purposes of color stream transmission locally (i.e. —at the software level) without affecting the overall global screen-level correction or calibration. The present invention is capable of preparing 212 a transmitter, rather than relying solely on the transmitter's inherent functional characteristics for the accuracy of the transmission. The transmitter may be prepared directly 216, i.e. using native screen characteristics, or adjustments thereto, of the transmitter screen and rely on transmission/reception-based correction, or prepared 218 via preparation computer program 920, i.e. transmitted using correction applied via transmitter software layer. For example, a software program-applied color correction may apply an offset delta of (−5, 1, −1) to an "olive" depiction of a color on a transmitter screen in order to adjust a transmitter's inaccurate display of olive from RGB (133, 127, 1) to the true RGB olive of (128, 128, 0) via transmitter software correction. The software-corrected color adjustment of the present invention takes multiple forms, which will be further described in this specification. At the simplest level, the preparation of the transmitter may simply include accessing a transmitter capable of transmission of color stream sequences at a suitable frame rate and gamut.

The transmitter readies the color stream sequence and in preparation 212 of transmission checks the transmitter's storage medium 704 or otherwise queries for correction instructions or coefficients 922 to apply 216, 218 to the imminent transmission. If a correction value is not available, the preparation of the transmitter may include powering the transmitter, starting the transmitter program (if any), or checking the attributes of the transmitter such as gamut, gamma, refresh rate, etc. The transmitter preferably includes an algorithmic logic unit 702 (ALU/CPU) in connection with storage media 704. Correction instructions may apply to any aspect of the color stream transmission and may include such characteristics as chromacity, luminance, gamma, etc. A preferred means of correction instructions includes a web cookie 922 (if implemented via a website), or by inference or detection of display characteristics from other means. A web cookie 922 is commonly characterized as a small piece of data sent from a website and stored in a user's web browser while the user is browsing that website. Every time the user loads the website, the browser sends the cookie back to the server to notify the website of the user's previous activity. A user that accesses the broadcast URI multiple times may avoid contemporaneous calibration of a transmission screen and instead rely on results of a previous calibration for color gamut/gamma correction that could be stored in the cookie.

A second preferred means of correction includes use of correction instructions 922 that include a global look up table that correlates standardized transmission device screen characteristics to a universal correction value; however, such correction means has limited applicability. Furthermore, the potential for universal application of a standardized correction value based on a model of transmitter is further challenged by a user's capacity to manually modify the transmitter from its preset characteristics. Although web browsers utilizing generic devices, such as tower/monitor combinations and laptops, convey minimal information regarding the physical display devices on which they operate, web browsers for mobile devices often can convey more information. In particular, the Hypertext Transfer Protocol (HTTP) identifies the client software originating the request, using a user-agent header. The user agent string may identify application type, operating system, software vendor, or software revision, by submitting a characteristic identification string to a server. In cases where mobile devices transmit a user agent string, the user agent string may identify the mobile device, and in turn, identify the transmission screen characteristics indirectly. Although desktop or laptop computer displays may vary widely, display screens for, say, APPLE IPHONE devices by version will not vary significantly for purposes of the present invention. Useful information may be gleaned from common repositories of device information, such as WURFL files. WURFL, the Wireless Universal Resource FiLe, is a Device Description Repository (DDR), i.e. a software component that maps HTTP Request headers to the profile of the HTTP client (Desktop, Mobile Device, Tablet, etc.) that issued the request. For devices wherein transmitter software is tied to one or a few specific transmission screens, the present invention may provide a correction value to the transmitter based on a prior calibration for a specific mobile device's transmission screen by identifying the corresponding mobile device using the device description repository, or by identifying the corresponding device directly through native software API's.

Alternatively, and as discussed elsewhere in this specification, a user may provide a correction value to the GUI via correction input fields 910 or other input method. Once received, the process 100 may make an adjustment to the depiction of colors on the transmitter. A transmitter implemented in a web page may use html attributes to alter the color depiction of a transmission screen, whereas a transmitter implemented in a native application may alter the color depiction directly. HTML color codes are hexadecimal triplets representing the colors red, green, and blue (#RRG-GBB). These color codes can be used to change the color of the background, text, and other elements on a web page. When a color stream sequence is received by the transmitter for the purposes of transmission, the present invention may select a color particularized for the transmission screen characteristics other than a color with the identical hexadecimal identifier. For example, a computer display having decayed color attributes may as part of a message color stream transmission be tasked to transmit red #800000 (RGB 128, 0, 0), but instead may transmit red #880000 (RGB 136, 0, 0), because for this particular display #880000 (RGB 136, 0, 0) may be closer to red #800000 than that monitor's depiction of red #800000.

The transmitter 902 may consist of a unit that possesses merely a color display or even a single RGB LED for the rapid depiction of colors. The preferred means of emitting 230 a color stream transmission is by the creation and positioning 228 of one or more discrete transmission elements 914. The use of a transmission element (a box, circle or other geometric shape) permits transmission of a code color sequence at a predefined location with predefined dimensions, both of which may be controlled via program code, e.g. HTML code or native application code. A transmission element 914 sized to be approximately equivalent to the size of a sensor or a sensor's optic 928 on a receiver 904, of the receiver body, minimizes the likelihood of third-party interception of the color stream transmission. That is, the body of the receiver can be used to physically block the view of the transmission element. Furthermore, a rapid succession of color stream transmissions by a transmitting element of a larger size could possibly induce seizures in a very sensitive patient.

The present invention can further make use of the additional spatial sampling pixels available to an integrated video camera that is capturing a transmission by incorporating calibration targets on-screen instead of, or in addition to, embedding a calibration signal within the color stream transmission. This could not only increase the accuracy of the decoding process, but could also increase the data transfer rate by optionally removing the embedded calibration signal. Additionally, it could be possible to achieve a higher bit density encoding by making use of the fact that all possible signaling levels may be displayed on screen simultaneously as part of the calibration target.

Another method to increase the data transfer rate is to use multiple transmitting regions on-screen as transmission elements 914a, 914b. This could be used in conjunction with overlaid calibration targets, or without. This method would result in multiple parallel transmissions occurring simultaneously, able to be decoded by the smart device with an integrated video camera. The transmission elements may be divided into a calibration transmission element 914b and a data transmission element 914a. The calibration transmission element 914b includes those color flashes later described as part of a calibration array of the present invention. The calibration element preferably includes the corners of the range of color triplets, which for RGB triplets may include (0,0,0); (255,255,255); (0, 255, 255); (0,0, 255); (255,255,0); (255,0,0); (255,0,255); and (255,0, 255)—or restrained versions thereof that represent the corners of the triplet as represented multidimensionally, e.g. (0,0,0); (192, 192, 192); (0, 192, 192); (0,0, 192); (192, 192,0); (192,0,0); (192,0, 192); and (192,0, 192). The calibration transmission element, because it need not include data-carrying code colors, may statically display the calibration colors for constant availability of calibration correction. The data transmission element 914a provides the color stream transmission as described in the present invention, the sole difference being that inclusion of the now-separately transmitted calibration array would be redundant. Any number of transmission elements of any variety may be used.

The transmitter then emits 230 the color stream sequence created during the initialization 102 step. By the terms emission and transmission, it is meant the sending of photons related to colors portrayed by the present invention; in many instances this may include a change in color, and in other instances merely the display of a static color. The emission is simply the color stream sequence, which preferably includes the color sequence, corresponding to the data as padded and encoded, and then appropriately framed (with or without calibration elements in a calibration array), transmitted as a stream of changing colors that are preferably then repeated 232. The use of frames by the present invention permits a receiver to ascertain the beginning, and potentially the number of frames to expect as well as the frame order in more complex framing schemes, of the color stream. The receiver 904 then receives 106 the color stream transmission.

Figure 6:
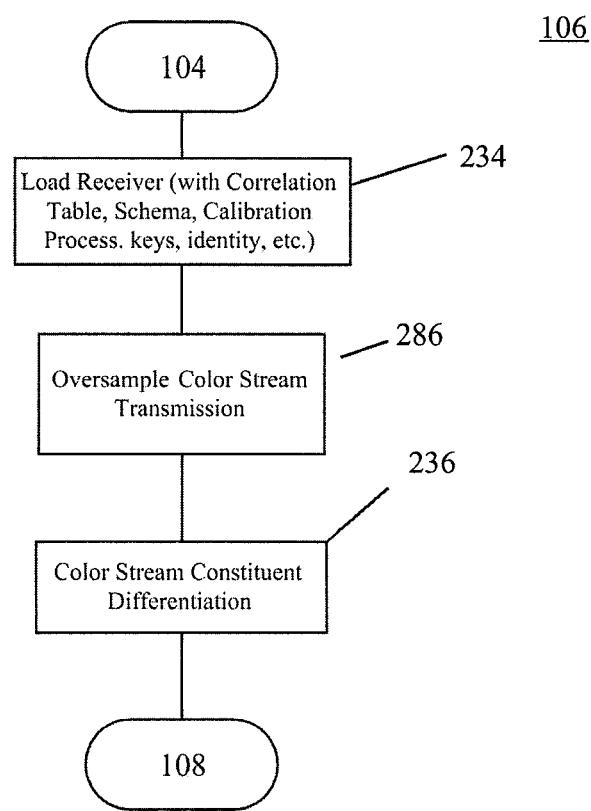
FIG. 6 is a view of a preferred receiving step of the present invention.

As shown by FIGS. 1, 6, and 13, the preferred receiver 904 of the present invention is a distinct unit that can be transported readily. The preferred receiver is a fob, sized to be portable, with a sensor 928, output 908, actuator 906, and computer components. The computer components may include an algorithmic logic unit 702 (ALU/CPU) in connection with storage media 704. The storage media preferably includes a computer program instruction set 934 for operating the steps of the process 100 present invention as well as interacting with components of the system 900 of the present invention. The receiver is loaded 234 to understand the environmental characteristics, significance, and substance of the color stream transmissions of the present invention, such as framing information, padding, color-matching, as well as other routines implemented in the initializing step 102. Two important files maintained by the storage 704 of the receiver 904 includes the correlation table 924 as well as operational instructions 938 that provide a priori environmental knowledge of standardized frame elements and characteristics. Standardized frame elements may include the significance of white symbols (occurrence and location), the significance of black symbols (occurrence and location), the significance of other non-data carrying symbols, calibration symbols and methods, header label types, significance of header label types, how many frames to expect for a specific header label type, the sequence number of frame types, etc. Instructions for performing the calibration process of the present invention are also stored in the storage medium 704.

The receiver sensor 928 oversamples 286 the color stream transmission emitted from the transmitter. By oversampling, it is meant that sensor 928 captures light and color at a rate significantly higher than the color stream transmission rate. A preferred capture (or oversampling) rate is twice that of the transmission rate, and an even more preferred capture rate is eight to ten times or more the transmission rate. The receiver detects, and differentiates 236 between, the various components of the color stream transmission with reference to framing instructions as understood by the operational instructions 938. The receiver 904 using the sensor 928 samples the color stream sequence as a series of numeric values corresponding to the digital counts of the sensor's RGB channels (and optionally a clear channel value). The numeric values may be transformed into RGB triplets, HSV triplets, or other means of characterizing colors into three base constituents corresponding to red, green, and blue levels.

As shown by FIGS. 1, 7, 12, and 13, the present invention extracts 108 the underlying data that was the subject of the coding of the initialization step 102. The extraction 108 may begin by characterizing 240 each color as received by the sensor into its characteristics, which may include constituent triplets, intensity, or other attributes of the received color. In order to decode a transmitted color stream sequence, one must first find a way to relate the color spaces of the transmitter and receiver. The transmitter screen transmits colors based on RGB triplets associated with the (corrected or calibrated) intended color at the transmitter, while the receiver receives a representation of the transmitted color as relative digital counts for each RGB channel. Because each possible transmitter will potentially have a different response to an input color, as well as the differing transmission environmental concerns (ambient lighting, other noise sources, etc.), the receiver essentially has no "context" to operate within—it generally does not know a priori what the exact transmission conditions are at the time of reception. Rarely, will a transmitter, absent preparation according to the present invention or specialized calibration, be capable of transmitting colors in form that fails to deviate from the triplets associated therewith. It is up to the receiver to relate discrete digital counts received by the sensor to color samples and ultimately to known color values from the correlation table.

For the present invention, a preliminary step in reduction to practice was to see how transmitted colors and received colors are related by a specimen sensor. The investigation included a defined 4×4×4 regular orthogonal grid of points in three-dimensions corresponding to the RGB color channels, with each axis going from 0 to 255. So the transmitter color space is defined as:

$$C_t=\{(0,85,170,255)x(0,85,170,255)x(0,85,170,255)\}$$
('x' denotes the Cartesian product).

During transmission, initial experimentation used gamma-corrected colors using an exponent of 2.0, so a given color $C_{ti}=(r_{ti}, g_{ti}, b_{ti})$ becomes $(r_{ti}^{1/2.0}, g_{ti}^{1/2.0}, b_{ti}^{1/2.0})$. While the computer system and display used actually had a gamma of 2.2, 2.0 was used as a compromise because other target systems use different exponents (for example, older APPLE computers use 1.8 for instance). Also, use of an inexact exponent tested the ruggedness of the process and system. Colors were transmitted in a random sequence in $C_{ti}$ at varying frame rates, and a large number of samples were taken with the sensor at varying sample rates and integration times.

Depending on the characteristics of the monitor, there can be a large amount of noise in the received digital count data that makes the overall orthogonal grid shape in $C_r$ hard to see. Applying a low-pass FIR filter to the data reduces the noise considerably, after which the overall shape of the data emerges more clearly. Still, the received "points" in $C_r$ were actually clouds of closely-spaced points (the three-dimensional orthogonal grid pattern was clearly visible however), with less dense points occurring between valid grid points due to sampling "transitions" between valid symbol colors (i.e. —the sensor integrating over two successive color transitions). After manually cleaning up the data (to remove transition samples between valid symbol points) a k-means clustering algorithm was applied to produce the actual points in $C_r$ (more accurately the mean point of each detected cluster around a valid transmitted symbol point).

Transmitter models vary dramatically, and as even similar models can be adjusted to vary one from the other, a receiver needs a basis for accurately understanding a color stream communication of the present invention over a wide variety of transmitter models and in diverse environments. Transmission of a color includes many bases for inaccuracy that may compound during the transmission process. A first source of inaccuracy is a transmitter's potential discrepancy in transmitting a specific color within a color gamut that is understood by a sensor unit to be the same color as transmitted. This inaccuracy may be caused by degradation of the transmitter's transmission cells, or otherwise faulty initial programming related to translation of an RGB triplet to a transmitted color. A second source of inaccuracy may be the inability to accurately compensate for the gamma curve (if any) of the transmitter. The so-called "gamma curve" of a transmitter directly impacts the preferred even spacing of colors received within a transmission. A third source of inaccuracy is introduced by ambient conditions, such as environmental lighting or other artifacts induced by a transmitter unrelated to the color stream transmission.

The key to ensuring correct interpretation of a received color stream communication is through calibration 242 based on colors supplied as part of a calibration array in the framing step 220 to determine their multidimensional relationship, and furthermore their normalization into a roughly orthogonal shape. Rather than attempt to rely on the inherent accuracy of the transmitter or the ability to understand, for example, a transmission of olive (128, 128, 0) as olive (128, 128, 0) at the receiver, the present invention may perform a calibration that corrects colors based on their relative relationship with one or more other colors, or their relationships within the entire transmission color gamut. The calibration 242 begins with a gamut calibration for each corner of a parallelepiped based on a three-dimensional representation of a triplet to discern the potential shape and volume of the transmission gamut. Each of these corners, including white and black, can be a component of a multidimensional representation that conveys information about the gamut. Furthermore, the calibration determines the discrepancy between received values and an ideal, orthogonal triplet value set. A color correction matrix is calculated that can be applied to individual received color stream samples within the gamut. The calibration 242 then proceeds to determine effects of the transmitter's gamma value by logically subdividing the channel gamut for each triplet element into evenly spaced colors and ascertaining the position of each color within the channel gamut.

The color correction calibration 242 begins by ascertaining the available color gamut for elements of a color triplet, e.g. HSV, RGB, etc. Rigorous examination of received colors to transmitted colors revealed that when expressed volumetrically (i.e. —the three RGB color channels mapped into a 3-dimensional coordinate system), $C_t$ and $C_r$ have an affine relationship: the "cube" defined by the points in $C_t$ (anchored at the origin 0, 0, 0) maps to a parallelepiped in $C_r$ offset from the origin by positive amounts in all three axes (due to the difference in relative channel sensitivity and wavelength sensitivity overlap as well as response characteristics of the transmitter). The parallelepiped's shear tends positive in the Green/Red and Green/Blue planes, and tends zero in the Blue/Red planes. The shear's magnitude is greatest in Green as Red and Blue increase. This means that the transformation from $C_r$ to $C_t$ can be defined as follows:

$$R_{rec} = (a_{r \rightarrow r} * r_{trans}) + (a_{r \rightarrow g} * g_{trans}) + \text{offset}_r$$

$$G_{rec} = (a_{g \rightarrow r} * r_{trans}) + (a_{g \rightarrow g} * g_{trans}) + (a_{g \rightarrow b} * b_{trans}) + \text{offset}_g$$

$$B_{rec} = (a_{b \rightarrow b} * b_{trans}) + (a_{b \rightarrow g} * g_{trans}) + \text{offset}_b$$

Note that these relationships imply a linear interference between the color channels. These equations relate the two color spaces regardless of environmental conditions. Further, environmental ambient lighting changes only affect the scale and offset of the parallelepiped in $C_r$, and have insignificant effects on its angles. This is extremely important as it means one can define an affine transformation $A_{t \rightarrow r}$ between $C_t$ and $C_r$:

$$A_{t \rightarrow r} = L_{shear} * A_{st}$$

Where $L_{shear}$ is a (linear) shear transform, and $A_{st}$ is an (affine) scale and translate. $L_{shear}$ tends to be constant across all environmental conditions for a given display, while only $A_{st}$ changes to any significant degree.

Upon discerning the scale and offset of the signal, then one can compute the inverse of $A_{r \rightarrow t}$ (the inverse of $A_{t \rightarrow r}$) and map points in $C_r$ back to $C_t$. Instead of computing $L_{shear}$ directly (which is also possible), a slightly different approach may be more suitable. We defined a new color space $C_{rn}$ dubbed "normalized receiver space." $C_{rn}$ is simply $C_r$ normalized to one and translated to zero. Specifically, $$C_{rn} = \{((r_{Ri} - r_{Rmin})/(r_{Rmax} - r_{Rmin}), (g_{Ri} - g_{Rmin})/(g_{Rmax} - g_{Rmin}), (b_{Ri} - b_{Rmin})/(b_{Rmax} - b_{Rmin}))\},$$

Where $cri = (r_{Ri}, b_{Ri}, cri)$ are the points in $C_r$ and $r_{Rmax}/r_{Rmin}$, $g_{Rmax}/g_{Rmin}$, $b_{Rmax}/b_{Rmin}$ are the maximum/minimum Red, Green, and Blue component digital count values found in $C_r$.

Then by computing the 4×4 affine transformation matrix $A_{rn \rightarrow t}$ which mapped $C_{rn}$ to $C_t$, the over-determined system was solved as such:

$$A_{rn \rightarrow t} * c_{rn\_corner\_1} = t_{r\_corner\_1}$$

$$A_{rn \rightarrow t} * c_{rn\_corner\_2} = t_{r\_corner\_2}$$

$$A_{rn \rightarrow t} * c_{rn\_corner\_3} = t_{r\_corner\_3}$$

$$A_{rn \rightarrow t} * c_{rn\_corner\_4} = t_{r\_corner\_4}$$

$$A_{rn \rightarrow t} * c_{rn\_corner\_5} = t_{r\_corner\_5}$$

$$A_{rn \rightarrow t} * c_{rn\_corner\_6} = t_{r\_corner\_6}$$

$$A_{rn \rightarrow t} * c_{rn\_corner\_7} = t_{r\_corner\_7}$$

$$A_{rn \rightarrow t} * c_{rn\_corner\_8} = t_{r\_corner\_8}$$

Where $c_{rn\_corner\_j}$ are the eight "corner" points of the parallelepiped in $C_{rn}$, and $t_{r\_corner\_i}$ are the eight "corner" points of the box in $C_{rn}$. This system produces 8*3=24 linear equations to solve for 12 unknowns (the bottom row of $A_{rn \rightarrow t}$ must be (0, 0, 0, 1)). A least squares solver computed an approximation of $A_{rn \rightarrow t}$; and once $A_{rn \rightarrow t}$ was known $A_{r \rightarrow t}$ can be redefined as:

$$A_{r \rightarrow t} = A_{rn \rightarrow t} * A_{r \rightarrow rn}$$

Where $A_{r \rightarrow rn}$ is a scale and translate affine transformation that maps $C_r$ to $C_{rn}$.

If the minimum and maximum values of $C_r$ are known, then one can compute $A_{r \rightarrow rn}$; however these values vary environmentally. Therefore the sensor should periodically sample (RGB=255, 255, 255) (White) and (RGB=0, 0, 0) (Black) at run-time and compute the scale and offset from these values—essentially a periodic 2-point calibration. It is important that these values be sampled periodically instead of just once because even small motions of the sensor, especially those that change angle relative to the display, can cause large differences in scale/offset.

The preferred algorithms use some combination of the White and Black colors ((255, 255, 255), (0, 0, 0)) not only for scale/offset calibration but also as a framing delimiter to indicate the start of a message "frame", each frame containing 6-18 symbols or more depending on message length and information encoding density. Details of framing are discussed elsewhere in this specification.

Assuming that the sensor can reliably detect the periodic White and Black colors within a sequence, one can compute $A_{r \to m}$ as:

TABLE 1

Affine Correction

| | | | |
|---|---|---|---|
| $1/(R_{max} - R_{min})$ | 0 | 0 | $-(R_{max} - R_{min})/R_{min}$ |
| 0 | $1/(G_{max} - G_{min})$ | 0 | $-(G_{max} - G_{min})/G_{min}$ |
| 0 | 0 | $1/(B_{max} - B_{min})$ | $-(B_{max} - B_{min})/B_{min}$ |
| 0 | 0 | 0 | 1 |

Where $R_{max}/R_{min}$, $G_{max}/G_{min}$, and $B_{max}/B_{min}$ are the RGB channel component digital count values of the White and Black colors within a given sequence. By applying this matrix to the transmitted colors, they can be effectively mapped into the corresponding transmitter color space for further decoding.

Figure 7:
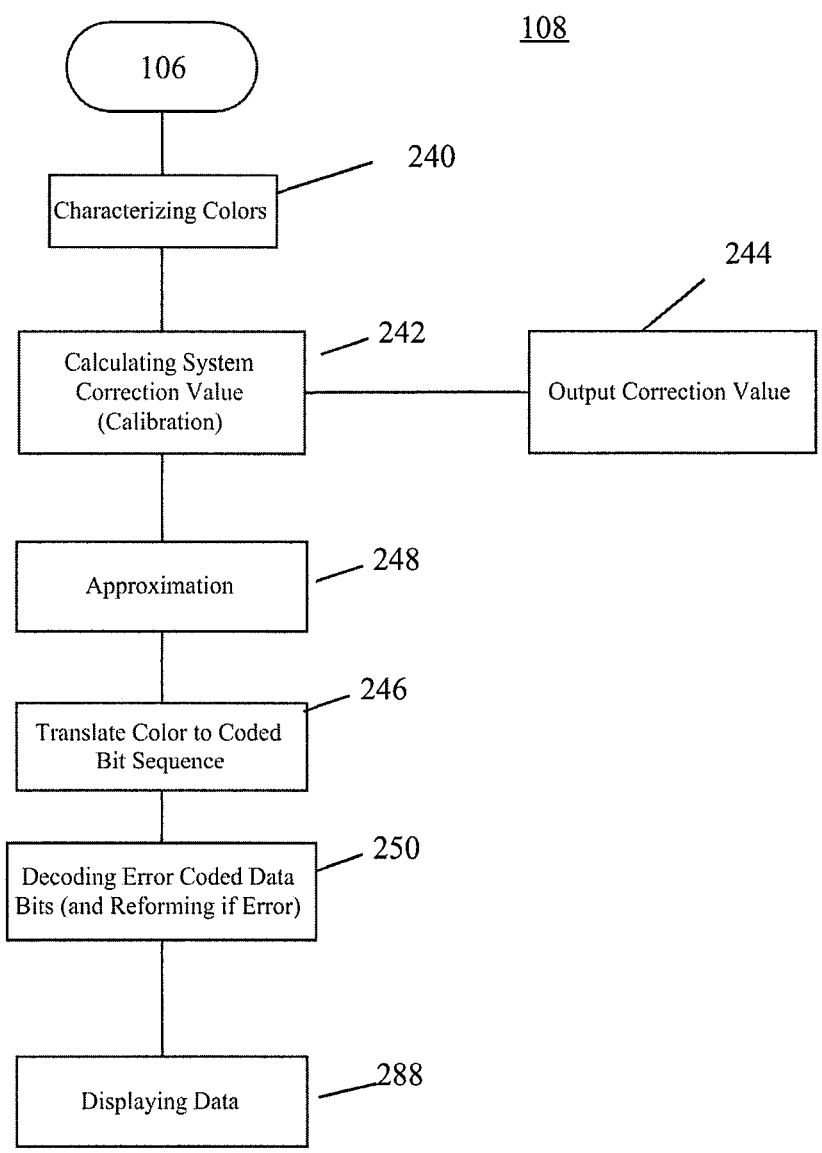
FIG. 7 is a view of a preferred ascertaining step of the present invention.
Figure 12:
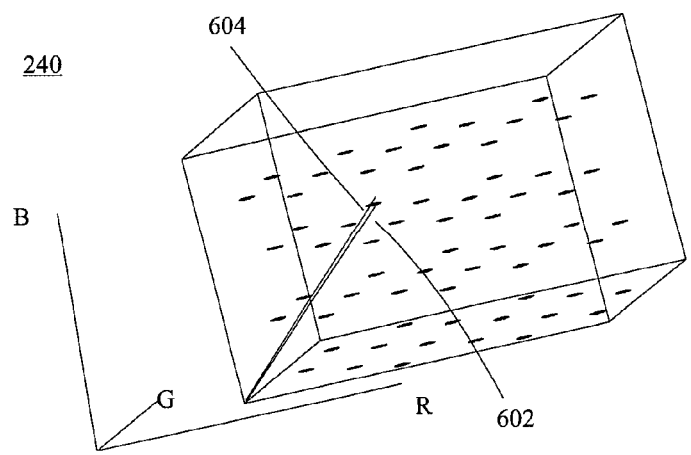
FIG. 12 is a view of the signaling space mapping step of the present invention, visualized.

The calibrating step 242 may further be refined to restrict the available mapped points to prearranged, preferred spacing. As shown in FIGS. 7 and 12, the color triplet may be expressed as a point in space within a color-space volume. The received color's triplet constituents, e.g. RGB, form the XYZ dimensions.

Figure 11:
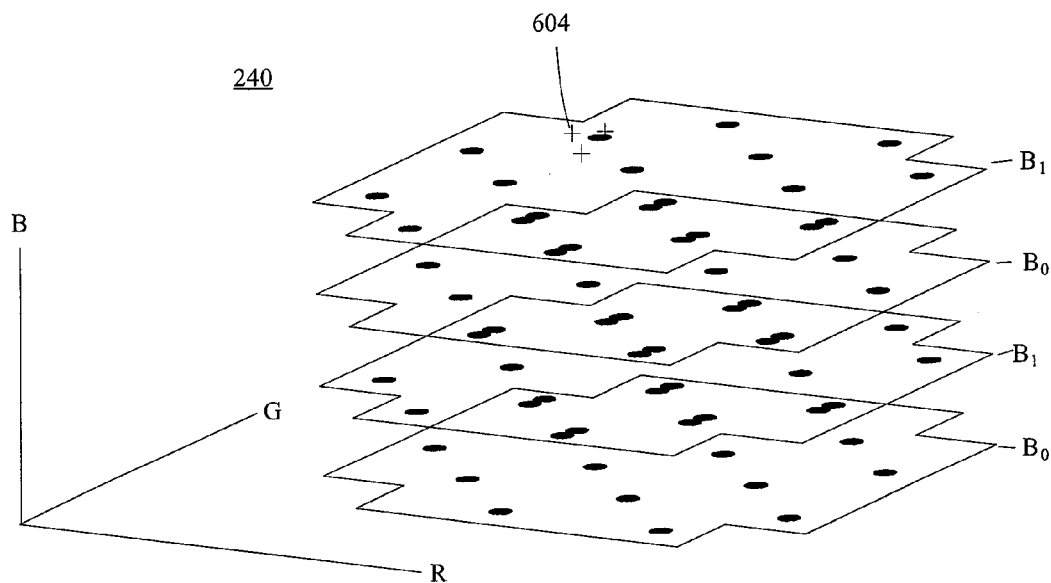
FIG. 11 is a view of the multi-plane signal constellation-mapping step of the present invention, visualized.

As shown in FIGS. 7, 11, and 13, the preferred way to perform color gamut calibration is to send a special "calibration frame" to the receiver (or optionally embed the calibration sequence described herein within a color stream transmission frame at the expense of increased transmission time). Essentially, this preferred calibration frame consists of just full intensity white, black, red, green, blue, red/green, red/blue, etc. In other embodiments of the present invention, a restrained corner frame may be sent that is representative of the corners without reaching the full extent of the corners, (e.g. 192, 192, 0), etc. It is less preferred to use a restrained calibration array set because "shrinking" the three-dimensional parallelepiped through which the calibration matrix is calculated introduces unnecessary imprecision. It is preferred to use only the 8 "corners," or extents representative thereof, of the cubic signaling space of the gamut, which when expressed volumetrically resembles a parallelepiped shape (the exact shape depending on both the transmitter and receiving sensor characteristics). From this, one can calculate a correction matrix via least-squares fit (or other mathematical means) to reduce the gamut to approximately cubic form while mitigating and/or eliminating the effects of inter-channel interference at the same time. This can be done in real-time using a least-squares solver (or by other means) to derive the color correction matrix. It is also possible to use only a subset of the corners of the cubic signaling space (for example, only white, black, red, green, and blue) as this would yield a much faster computation at the expense of a slight reduction in color correction accuracy.

To extend this further, one could use symbol position context encoding, described elsewhere in this specification, to associate a calibration frame to any given monitor uniquely. The transmitting software 920 may be responsible for tracking each unique display and associating the corresponding symbol position context encoding for it. Considering that the receiving device can store its calculated calibration coefficients with the unique "context" identifier corresponding to the unique display, the transmitter can then later send any arbitrary sequence of data frames with the same symbol position contextual encoding. This allows the receiver to look-up the appropriate calibration to map the receiver's color space into the transmitter's color space. Note that this scheme requires absolutely no additional protocol overhead when used with the black (or white) symbol exclusively—and very little overhead when used with other contextual symbols.

Another method to derive a color gamut calibration involves the use of the white-point response of a given monitor, that is, the normalized RGB sample values of the white symbol, as an index into a pre-defined lookup table of calibration coefficients. This method would require taking samples from many different unique monitors using many different display technologies to build a multi-dimensional correlation lookup table a priori. The advantage of this method is that it would not require any prior user-guided color gamut calibration process, nor would it require any additional protocol or transmission overhead. The disadvantage is that the calibration could very well be inexact since it uses a lookup table of calibration coefficients—an "outlier" display could possibly break this scheme. This can be mitigated somewhat by the use of Trellis Coded Modulation ("TCM") and Forward Error Correction ("FEC") in the coding and modulation described elsewhere.

Note that it is also possible to combine one or more of these methods to ultimately apply a color gamut calibration such as starting with a lookup table approach, and falling back on a calibration array for real-time calibration.

The calibration 242 may further attempt to calculate a gamma correction. The color gamut calibration calculation described above only takes into account the overall shape/extents of the transmitter and receiver color spaces—one should also address the problem of calibrating the location and relatively even spacing of the symbols within the volume of the signaling space. The actual output gamma of the display (and its uniformity) along with the gamma exponent used to derive the transmission color set dictates whether or not the symbols within the signaling space are evenly spaced, or otherwise optimized. A calibration correction is preferred to account for the non-optimum case in real-time.

Some classes of transmitting device displays (such as smartphones, tablets, etc.) can be pre-calibrated by measuring their actual gamma output a priori and choosing the gamma-corrected transmission color set accordingly. This is applicable when the transmitter software knows what platform it's operating on—such as by utilizing the common "user-agent" encoding present in web browsers, or by other means (native software APIs for example). Generally, these classes of devices do not allow an end-user to change or calibrate the RGB gamma response of the display—only simple controls such as brightness or contrast. Furthermore, the actual gamma output of each device could reasonably be assumed to be consistent from device to device given that there should be very little or no variation in display output for a given distinct device. This concept is generally not feasible in a desktop environment however, since this particular class of device can have any combination of display types connected to it. Therefore, alternative solutions to the problem may be used.

One alternative to using a fixed transmission gamma incorporates the idea of an interactive gamma calibration between the transmitting computer system and the receiving device—essentially preparing 212 the transmitter by receiving an instruction to adjust 216 the transmission gamut/gamma dynamically in software, or by making modifications 218 to the overall gamut/gamma calibration of the transmitter either at the operating system level or at the monitor front-panel level. To do this, the transmitter software, or hardware as the case may be, would be implemented with calibration controls to allow adjustment to the gamma exponent used to map colors into symbol space for each of the RGB channels (described above). The transmitter would send one or more repeating special calibration sequences to the receiving device, which could also include a gamut calibration at the same time. The receiver would then receive the special calibration sequence(s) and calculate the actual gamma response of the transmitter, optionally per channel, which would then be displayed 288 in some form on the receiving device's display either as a numeric value, a correction value from the expected ideal gamma encoding, or as a graphical representation such as distance from a target reticle. The preferred GUI includes input fields 910 for color characteristics, including gamma and triplet values for preparing 212 the transmitter for accurate gamut/gamma transmission. The user would input these values to modify the transmitter output gamut/gamma (or optionally adjust the transmitter gamma controls some other way accordingly) to optimize and equalize (as much as practically possible) the distance between symbols in each of the three RGB channels as detected by the receiver 904. The receiver may output 244 these values via the receiver output display 908, which may be capable of graphical or character symbol display. Essentially, this scheme forms a closed control loop to calibrate the receiving device to any given display's output gamma. As this type of calibration happens entirely at the transmitter itself, no gamma calibration coefficients need to be stored on the receiving device.

Another solution to the problem of calculating gamma correction is the possibility of detecting the gamma offset in the received signal and then calculating a transform to correct the signal "on-the-fly" by the receiving device (or alternatively, modifying the actual signal constellation sampling points in the receiver accordingly). This could be done one of two ways.

The first method involves sending a known calibration sequence consisting of substantially evenly spaced transmission intermediate symbols for each RGB channel, including the use of only a single intermediate symbol exactly in the middle of the constellation signaling space to derive a gamma curve approximation. The receiving device would then apply a curve fit to the resulting received sample point(s) to measure the transmitter gamma curve. The signal could then be gamma-calibrated by inverting this curve fit and applying it to the samples in each of the RGB channels. Alternatively, constellation mapping points could be modified based on the received spacing. This is not optimal however, as transmitting with an incorrect gamma puts some received symbols closer together and some farther apart. Therefore, it is possible that the symbol matching/forward error correction could fail given these circumstances.

Another approach is to use statistical and/or computational geometry methods to identify the most likely constellation point mapping from the received data, ignoring the gamma correction altogether. This would require buffering many received samples and processing the samples a posteriori. Extending this idea further, and considering there is a somewhat predictable pattern to the transmission (induced by the TCM/FEC described elsewhere) it may be possible to perform soft-decision maximum-likelihood decoding without regard to gamut or gamma calibration. This would represent the ideal scenario, since no outside user intervention or special transmitted calibration sequences would be required.

Once the calibration correction, composed of a gamut calibration, gamma calibration, and/or other calibration value, has been calculated 242, the received, corrected color value is then compared to the constellation of possible stock symbols to approximate 248 the true original color, i.e., as transmitted, from the received color. By approximation, it is meant that the process accepts the color stream transmission color constituents as received and applies the calibration correction as calculated in 242 to ascertain the color constituent, e.g. code color flash, of the color stream transmission intended to be transmitted by the transmitter. Turning now to FIGS. 1, 7, and 9-13, the present invention utilizes a closed quantity set of preferred, predefined spacing of potential color symbols as data-carrying code colors. The preferred data-carrying color symbol quantity is one-hundred twenty eight; the transmitter's color correlation table and the receiver's color correlation table are standardized to the closed quantity set number. The preferred number of colors used in the present invention consists of six red values, six green values, and four blue values. When a particular quantity of color symbols is used, then each point representative of a data-carrying color symbol may be translated 246 into a binary sequence represented by the data-carrying color symbol.

Gottfried Ungerboeck, in a paper entitled "Channel Coding with Multilevel/Phase Signals," published January, 1982 in IEEE TRANSACTIONS ON INFORMATION THEORY, Vol. IT-28, No. 1, and herein incorporated by reference, argued that error performance of convolutional codes could be improved if designed by maximizing the Euclidean distances between trellis paths which merge into and out of the same state. This is accomplished by tailoring the convolutional coding scheme to the signal constellation of a given modulation technique so that the operations of error coding and modulation are essentially combined.

Figure 9:
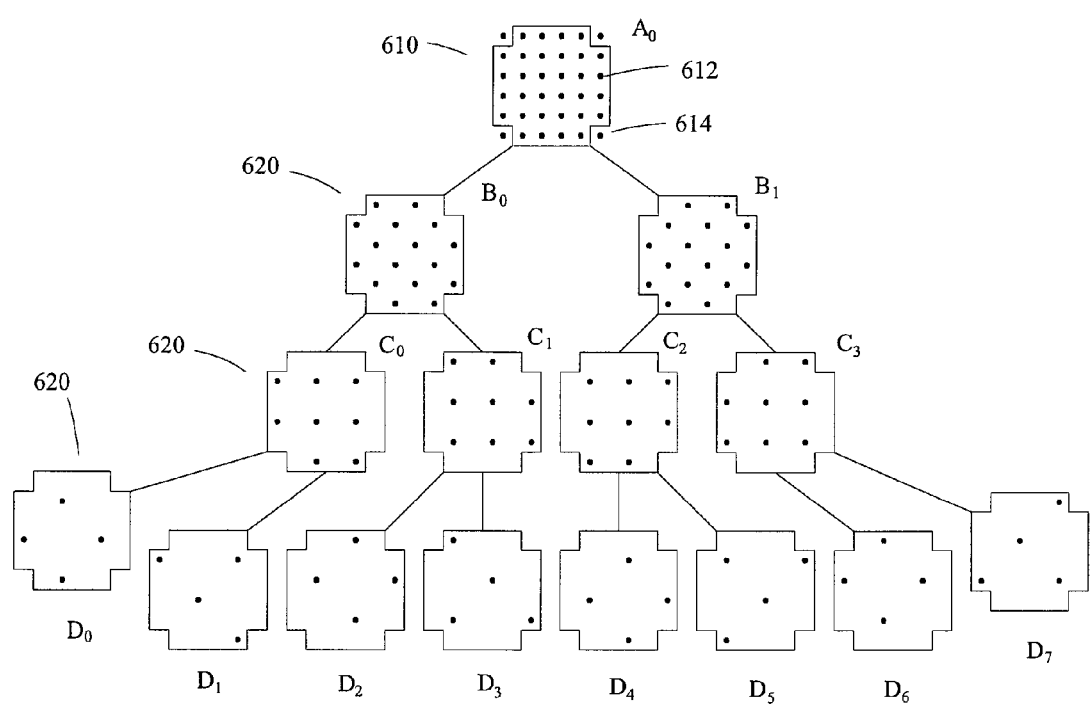
FIG. 9 is a view of a single plane of signal constellations (and their subset constituents) of the present invention.
Figure 10:
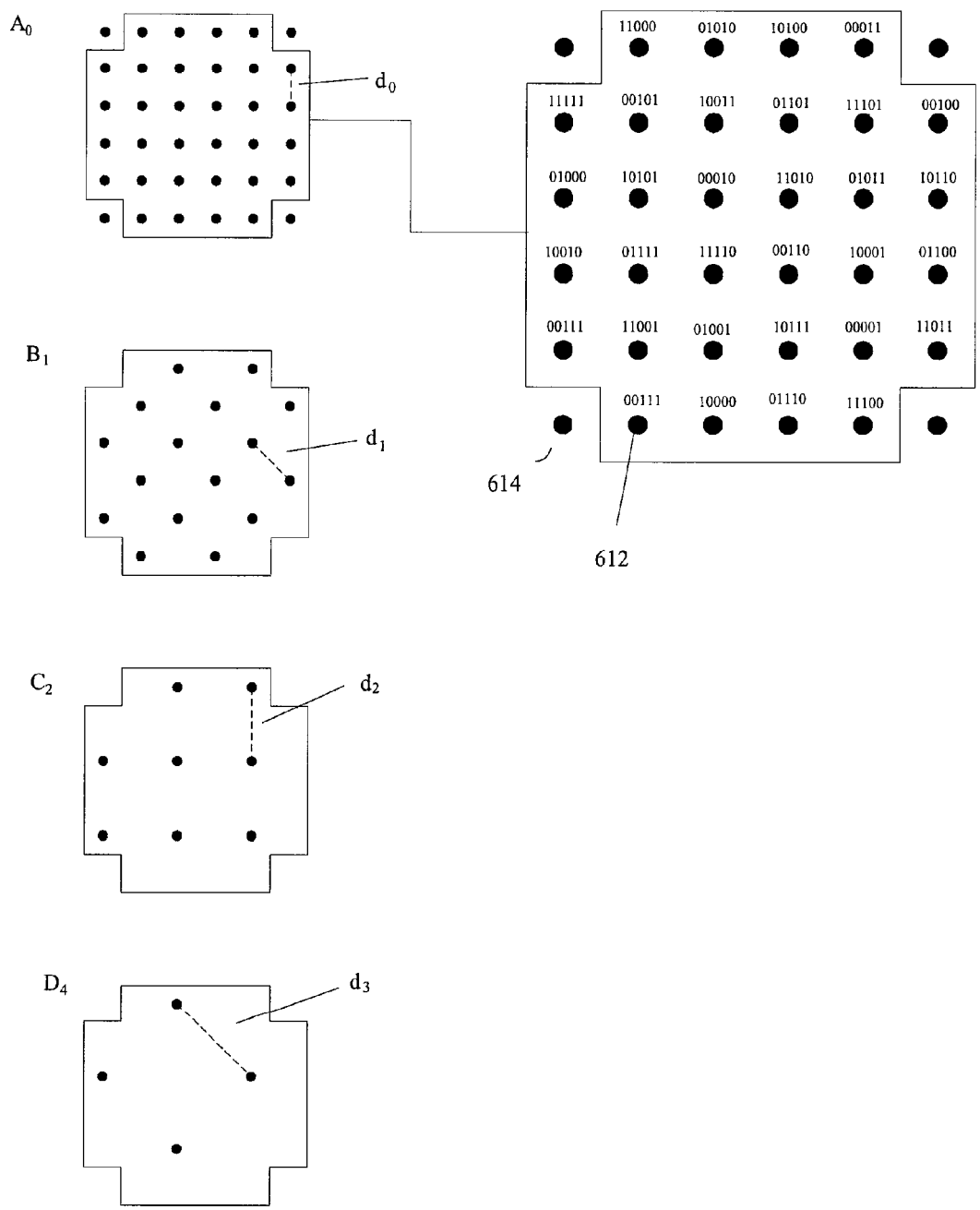
FIG. 10 is a detailed view of a single plane of signal constellations (and their subset constituents) of the present invention.

Take as an example the depiction in FIG. 9, which graphically represents partitioning a CROSS-32 signal set constellation inspired by the Ungerboeck method. A complex signal constellation 610 is broken up into subsets 620 or cosets. The preferred breakdown of symbols is the use of symbols within the "cross" to be symbol sets 612 that correlate to predetermined data-carrying color symbols within the gamut. At the corners of the plane, there are reserved calibration sets 614 for calibration rather than symbol translation (non-data carrying symbols). When considered volumetrically, as shown in FIGS. 11-12, the calibration sets 614 represent the extents of the volume, RGB. It is a feature of a set partitioning method that the minimum Euclidean distances measured between any of the points on the subset constellations exceed the minimum Euclidean distance between points on the constellation from which the subsets are derived. Thus, for example, as shown in FIG. 10, the minimum Euclidean distance between any two points on the original constellation at the top of the trellis coding tree is less than the minimum Euclidean distance between any points of the constellation shown in subsets B. In like fashion, the minimum Euclidean distances between any two points on the constellation subsets C is greater than the minimum Euclidean distance between any two points in the subset B, and so on. As detailed above, an increased minimum Euclidean distance between any two points in a signal constellation ensures that the probability of mistaking similar encoder output sequences is minimized. The error performance of the coded scheme is a function of the minimum Euclidean distance between any two given paths. To reduce the probability of error, the minimum Euclidean distance must be increased. Specifically, $$d_1 = \sqrt{(d_0)}$$

$$d_2 = \sqrt{(4(d_0))}$$

$$d_3 = \sqrt{(8)}d_0$$

Furthermore, any of the Ungerbock set constellations may be used with the present invention, such as 4-PSK, 8-PSK, 16 QAM, 64-QASK, 128-CROSS, etc.

As is shown in greater detail in FIG. 10, each data-carrying color available to the process for information transmission should be equated to a symbol point 612 for a stock code color. In the CROSS-32 scheme, there is allowance for five bits of binary data. Rather than attempt a single plane corresponding to 128 data-carrying color symbol points preferred by the present invention, it is preferred that the present invention include quantized planes stacked in three dimensions to relate two additional bits of data. Two stacked planes may represent the two states associated with an extra binary digit; four stacked planes may represent the four states associated with two extra binary digits, etc. In other words, the lowest plane may represent 00, the next highest plane may represent 01, the next, 10, and the highest 11. The exact binary representation is arbitrary, and the binary digits encoded within the stacked planes do not necessarily need to contain error correction information. As shown in FIG. 11, the use of discrete, quantized signal constellation planes permits increased coding density. The present invention preferably interleaves subset/opposite subset definitions in the Z-plane to maximize the Euclidean distance between symbol points in the X, Y and Z axes simultaneously by removing adjacent neighbor points—thereby preserving the error correcting properties of the code in the Z axis while simultaneously expanding it to work in all three dimensions at a higher bit density than conventional, planar CROSS-32. Because the Euclidean distance between symbols is maximized in all three dimensions (given the alternating coset definitions in the Z plane), the coding, modulation, and use of the three-dimensional signaling space are nearly optimal. The multidimensional plot of a received, and preferably calibration-corrected, code color may be compared to available plots to locate a nearest neighbor point. Because "adjacent neighbor" plot points are removed in the symbol optimization of co-set creation, the likelihood of determining a transmitted triplet from a received triplet is further increased by a comparison of the point as received to the nearest neighbor point. For purposes of clarification, "adjacent neighbor" and "nearest neighbor" are used, respectively, to describe the nearest stock triplet point—whether or not available in an applicable co-set—and the available plot point closest to a received triplet plot point.

When the front-panel contrast/brightness controls of the display are maximized (or nearly so), colors near the top of the extents of RGB input values tend to "run together" (e.g. differentiating between RGB channel value=228 and RGB channel value=255 is indiscernible or hard to discern). A goal of the present invention is to create an evenly spaced three-dimensionally orthogonal symbol set within the display gamut of a given monitor. To do this, the RGB color space can be divided into even steps. For example, to create a 6×6×4 matrix (corresponding to the CROSS-32 symbol set described above utilizing four Z-planes) we must divide the red/green channels by five and the blue channel by three. To compensate for display saturation, the present invention may arbitrarily restrain the RGB extents of the data-carrying signaling space to approximately 87.5% of maximum while leaving the non-data-carrying calibration/protocol overhead symbols at 100%. Note that 87.5% was determined experimentally, but could vary anywhere between 50% and 99%. Using the above example, the data-carrying color symbol set would be equally spaced from RGB=0 . . . 223 in this case (for each of the color channels). White, Black, and the rest of the protocol overhead symbols would use the full RGB extents of 0 and 255 per channel, or could optionally be truncated as well. Furthermore, the restraint of code colors to be some percentage of full intensity may affect other aspects of the present invention, for example the even spacing of the stock code colors may be based fractionally of the restrained maximum (e.g., 223) rather than the actual maximum (i.e., 255).

To get an evenly spaced output from the monitor, the transmitted RGB values must be gamma-corrected accordingly. This can be done by applying a fixed gamma exponent. As long as a given monitor's actual response gamma is reasonably close to the gamma exponent used to encode the color set, correct symbol decoding is readily carried out at the receiver (and is also aided by the forward-error-correcting nature of the TCM scheme described above). A fixed gamma encoding could be applicable in closely controlled environments; when the opposite is true however, additional measures must be taken to ensure the reliable decoding of the transmission.

When data-carrying color symbols are translated to septets, or other binary value, the septets are decoded 250, which is the reverse of encoding. As further explained in relation to coding, convolutional encoding and Viterbi decoding provides for a reduced likelihood of undetected errors at the receiver. A convolutional encoder correctly configured ensures that there are specific state paths, which are typically expressed in a Trellis diagram. For example assume that in a serial transmission FEC encoded one/two system, a three-bit data stream 1-0-0 is properly encoded as 11-10-11 by the encoder as described above. Also suppose that the receiver detects the transmitted signal erroneously as 11-11-11. In order to determine what the original transmitted data was, the decoder performs a maximum likelihood decision based upon the possible state transition paths that the encoder might have taken. Since the encoder is typically set to state 0 at initialization, the decoder assumes that the detected sequence of data bits began in state 0. The decoder then examines all of the paths that began at state 0 and terminate at a state three symbols later. In order to identify the most likely path, the decoder determines the probability that the detected data sequence was produced by one of multiple paths until a probability has been calculated for each possible path. The path having the highest probability is then selected as the actual path according to either hard or soft decision methods described in greater detail below.

In the preferred embodiment of the six/seven forward error correction code system, eight possible encoding states (which in the preferred FEC of FIG. 4B, corresponds to the three least significant binary digits formed by M5, M6, B7) are used along with a maximum likelihood Viterbi decoder to identify the most likely transmission sequence based upon the smallest cumulative Euclidean distance metric as described below.

Typically, Trellis decoding techniques calculate path probabilities based upon either Hamming or Euclidean distances between the detected signal and the signals generated by the possible trellis paths. In accordance with the teachings of the present invention, Euclidean distances are used as the measure of path probability, as discussed in greater detail below. However, in order to provide a clearer understanding of the method of determining the probability of a possible trellis path, a brief discussion of Hamming distance is also provided.

Hamming distance is defined as the number of bits by which two binary sequences differ. For example, the Hamming distance between the binary words 110 and 101 is two, while the Hamming distance between the binary words 111 and 011 is one, etc. Based upon a Hamming distance evaluation of the possible paths, the probability that a given path has generated a received data sequence can be determined by calculating and adding the Hamming distance for a predetermined number of pairs.

Another measure of the probability that a given path has generated a binary sequence is based upon Euclidean distance. Euclidean distance is the length of a straight line between two points in space (in this case, within a 3-dimensional signal constellation). In general, probability measures based upon Euclidean distances exhibit better accuracy than probability measures based upon Hamming distance. This is because probability measurements based upon Euclidean distance take into account the received signal characteristics, which is discarded when using Hamming distance as a probability metric. The probability that the detected signal has been generated by the trellis path represented between potential symbol triplets and received symbol triplets is a distance function of the square root of the sum of the squares of the distances in 3 dimensions. The greater the distance function along a given path, the less likely that path is to be the one that generated the detected signal sequence. In this manner, a more accurate estimation of the transmitted data sequence can be obtained. If there is an error in data, the binary digits may be reformed 250 in the decoding stage according to the above-mentioned principles of path likelihood.

The complexity of a signaling system decreases its inherent accuracy. As the number of points in the signaling constellation (i.e., the number of possible output values) and the number of states in the trellis encoder increase, the number of possible trellis paths increases as well. The symbols' binary sets are discerned and translated 246 from a table of triplet values associated with the colors, i.e. the correlation table run in reverse. When the present disclosure describes "burst" transmissions, it is meant the use of a single entity to convey multiple data components. Although burst transmission is a pre-existing concept, the concept of applying error correction to a lengthy data component (e.g., bit sequence) based on a single data component (e.g., color flash) and then using the lengthy data component to check the accuracy of the single data component is a key concept of the present invention. Returning to FIG. 7, the decoding binary sets are reassembled 250 into their pre-transmission form and the information of the coded sequence is extracted and then displayed 288, if desired.

Turning now to FIGS. 1, 2, 7, and 16, the present invention includes a method 100 for validating a commercial transaction. The method 100 includes establishing 276 a client-server connection between a client computer 702 and a server computer 710 over a network. The commercial transaction may include the exchange of any alphanumeric information, particularly information that is sensitive in nature. Examples of network communications that may be capable of the validation of the present invention include financial instruction transmissions, bank account access, electronic mail, and the like. The establishing step may include any form of protocol-based interaction between physically disparate computing systems. Access control and authentication of remote users has been a problem of increasing importance, particularly in the field of electronic funds transfer (EFT), and other fields requiring secure data communications. Generally "secure" privacy mechanisms, such as those known as public key crypto systems may be used with the present invention. In general, the public key system includes multiple terminals coupled through a communications medium, wherein each terminal has an associated encryption procedure (or transformation or operator) E and different decryption procedure (or transformation or operator) D, which may be applied to a message M. These transformations E and D are related so that E(M)=C and D(C)=M. Moreover, pairs of transformations E and D are relatively easy to generate, but D is substantially not derivable from E. As used herein, the term "substantially not derivable" means not practically feasible. In addition, the encryption transformation and the decryption transformation are inversely related so that E(D(M))=D(E(M))=M. An encryption transformation meeting these conditions is referred to as a "trap-door," or one-way function.

Each terminal may generate its own encryption key, decryption key pair (E, D). By way of example, a first terminal (denoted A) may be characterized by an encryption key EA and a decryption key DA, and a second terminal (denoted B) may be characterized by an encryption key EB and a decryption key DB. In a typical public key system, the encryption keys EA and EB are made publically available, while the decryption keys are kept secret by the respective terminals. Terminal A may then use terminal B's encryption key to send an encrypted message C=EB(M)) to terminal B over an open, or non-secure, channel. Since only terminal B knows DB and DB is substantially not derivable from EB, only terminal B can determine the message content of the encrypted message by reverse transforming C, i.e. DB (C)=DB (EB (M))=M.

Moreover, if terminal A had further encoded C with its secret decryption key (i.e. DA (EB (M))=C), then terminal B can decode the message using terminal A's known encryption key (EA) and its own secret decryption key DB to obtain the message M, i.e. EA (DB (C)=M), and be assured that only terminal A could have authored the message (since only terminal A could generate a message that could be decoded with EA).

The integrity of public key systems is primarily dependent on the degree of confidence in the one-way trap-door function. There are many approaches to the implementation of public key crypto systems. One very popular method is RSA, which is based on the difficulty of factoring large composite numbers. Another method is Elliptic Curve, which is based on the algebraic structure of elliptic curves over finite fields. While all known approaches may be considered to be "breakable" in some sense (for example, by brute force), at the time of writing RSA algorithms using key lengths greater than or equal to 2048 bits and Elliptic Curve algorithms using key lengths greater than or equal to 256 bits appear secure to presently known practical attack vectors. Given that it is impractical to transmit a 2048-bit encryption key over the present invention, Elliptic Curve is the preferred means of security for public key cryptography based color stream transmissions due to its significantly reduced key length requirements to attain the same levels of security. Note that it is possible to use symmetric or "secret key" cryptography also with the preferred invention, or in combination with public key cryptography. Symmetric algorithms rely on a pre-shared common key used for both encryption and decryption. Examples of symmetric algorithms include DES (Data Encryption Standard) and AES (Advanced Encryption Standard), among others. A Message Authentication Code (MAC) is a cryptographic hash function utilizing a secret key and operating over a given message, which is designed to provide a measure of message authenticity (i.e. —an attacker would need to know the secret MAC key in order to forge a message to a given recipient). Typically, MAC's are appended to (an optionally encrypted) message to prove the message is authentic and has not been tampered with.

A transmitter is initialized 102 on the client computer for transmitting a color stream transmission from the server computer. The color stream transmission includes a validation key and a full or partial MAC translated 206 to binary, optionally 214 padded, 208, 210 FEC encoded, and 220 framed as described elsewhere in this specification. The color stream transmission is transmitted 104 from the transmitter displayed on the client computer at an appropriate transmission frame rate based on the characteristics of the transmitter. A message authentication code (MAC), or a portion thereof, is separately displayed as alpha-numeric characters on the client computer which was generated from the server computer based on the contents of the validation key. The color stream transmission is received 106 on a distinct receiver. When the receiver is positioned proximate to said transmission screen, the receiver receives 108 and extracts the validation key and the (partial) MAC from the color stream message transmission and may display 288 the validation key on the receiver screen output. The entire MAC, or a portion thereof, may also be displayed on the receiver screen output—the purpose being so the user may verify the authenticity of the message (the MAC or partial MAC would match what was displayed on the client computer). The validation key may be self-validating; in other words the subject, existence, or other characteristic of the validation key may authenticate the server computer or the information provided thereby. The receiver can also calculate a MAC on the validation key and compare it to the received MAC (or partial MAC) to validate authenticity. The input 110 of the validation key may also initiate a process that leads to the authentication of the client computer or its information. Furthermore, the receiver may include an accelerometer (or other input device) in signaled communication with the ALU 702 of the receiver. The accelerometer (or other input device) may signal 272 state transitions in the receiver, such as turning on, turning off, erasing screen output, pausing screen output, and other functions related to the display, retention, and processing of information.

Consider the case where a user's computer is compromised in some way, perhaps with malware, a Trojan horse, a virus, etc. This attack vector, commonly known as man-in-the-middle or man-in-the browser, is able to modify and/or conceal the information exchanged between a user on one host computer and a service on a different host computer. For example, during an online banking funds transfer an exploited user's browser would show the exploited user its requested transfer of a specific amount of money from their account to another approved account. In reality the attacker could transfer an identical or larger sum to its own designated account without the knowledge of the user and with no visual indication in the browser. Below is an illustration of how the present invention might ensure the security of an online-banking transfer scenario:

User A logs into his/her bank and creates an online funds transfer transaction in the amount of $10,000 to account number "1234567." The online banking system sends a confirmation of the transaction back to the user with the amount, $10,000, and account number, 1234567, in plaintext, which is displayed in the browser. It also sends an encrypted color stream message transmission consisting of the transfer amount, the account number, and a validation code. The transmission appears as a series of sequential colors on the transmitter screen. The user receives and decodes the encrypted color stream transmission using an implementing device. The transfer amount and account number appear on the token display along with the validation code. If the color stream message transmission information matches what is displayed in the browser window (or application) of the online banking system, the user enters the validation code into the browser (application) and the transaction is processed. If, however, the light/color-based transmitted information does not match what is displayed, the user could assume that their host computer is compromised and the user would not enter the validation code. The transaction would therefore not be completed and the user would take the appropriate steps to disinfect its computer.

Figure 17:
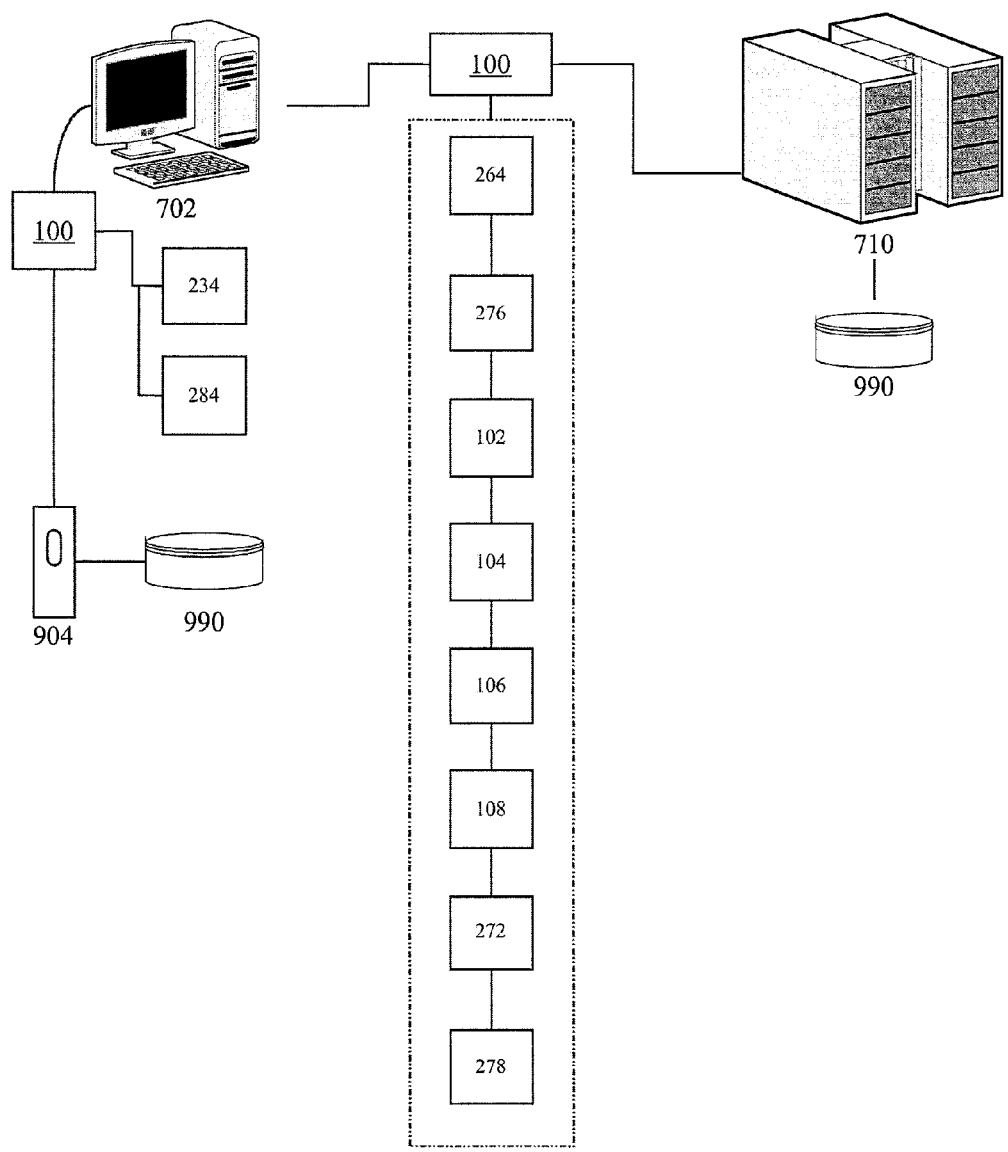
FIG. 17 is a view of a preferred (optionally anonymous) communication version of the present invention.
Figure 18:
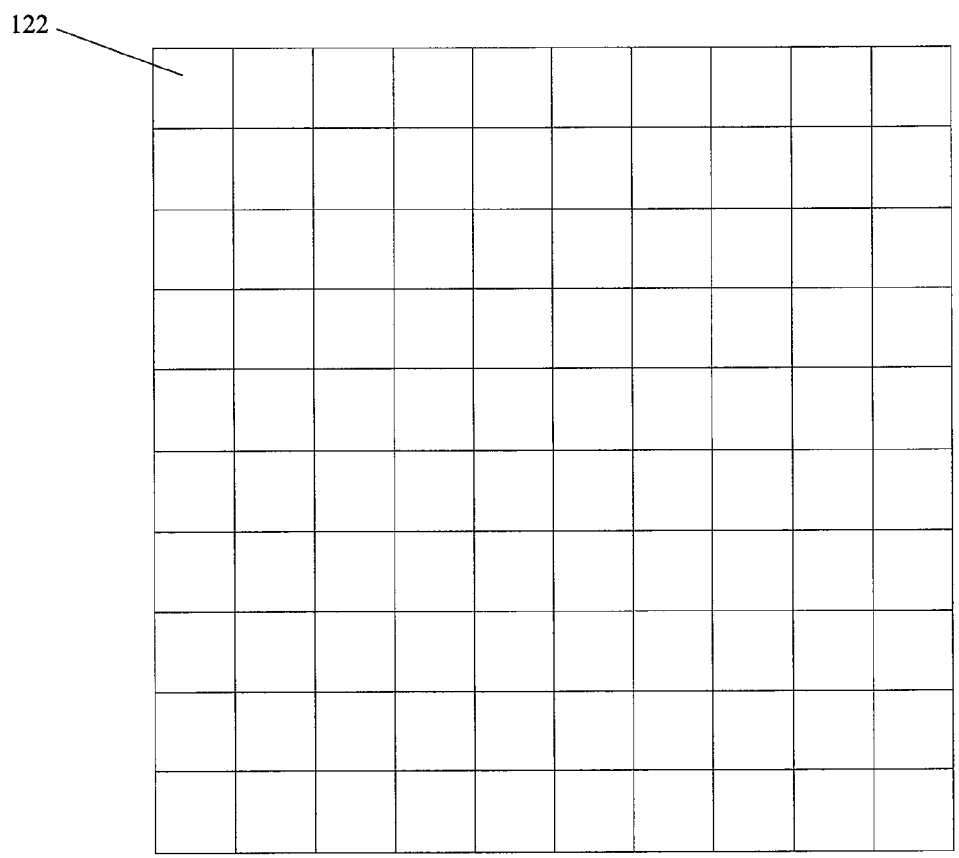
FIG. 18 is a view of an example sensor array embodiment of the present invention.

Turning now to FIGS. 1, 6 and 17, the present invention further includes a public communication system and method 100 amenable to (optionally anonymous) communications. In this scenario, public key cryptography is implemented within the implementing device allowing one user to encrypt a message that only the implementing device can decrypt.

The distinct receiver 904 of the present invention is loaded 234 with one or more private keys stored in memory 990. The receiver is associated 284 with a common identifier and one or more public keys in a public key escrow database in the memory 990, wherein the public key(s) for each receiver are a function of the private key(s) held only within the implementing device. As implementing devices are manufactured, each receiver is preferably assigned a random serial number. One or more public/private key pair(s) for the implementing device are generated, and the public key(s) are recorded in a "key escrow database" along with the corresponding implementing device's serial number. The private key(s) are loaded into the implementing device (or completely generated on the device) and never extracted or recorded elsewhere.

The public key(s) are published 264 over a public network. A party that desires to send information as a private message to the owner of an implementing device, establishes 276 a client-server connection between the sender's client computer 702 and an escrow server computer 710 over the network to access the public key(s). The transmitter is initialized 102 to transmit the message encrypted pursuant to one of the public keys corresponding to the implementing device and converted into a color stream message transmission. The color stream transmission is transmitted 106 and then received 106 on the message recipient's implementing device. The color stream message transmission is then decrypted with the corresponding private key on the implementing device and reviewed to ascertain 108 the original message. It is preferred that the information is displayed 288 as characters on the output screen of the receiver 904.

As shown in FIGS. 13 and 17, the preferred receiver 904 of the present invention includes an accelerometer 906 or other means of signal input, e.g. a button. The accelerometer is in signaled communication with the ALU 702 of the receiver. The accelerometer may signal 272 state transitions in the accelerometer, such as turning on, turning off, erasing screen output, pausing screen output, and other functions related to the display, retention, and processing of information. In an ideal scenario, a message recipient can receive a secured message and with the simple shake of the wrist blank the receiver screen, and perhaps those portions of memory 704 dedicated to the cipher, the received information, or even the private decryption key(s) on the implementing device; in the latter case, making it impossible to further recover the original message from a replayed transmission.

The (optionally anonymous) communication method works best when anonymity is maintained from point to point throughout the communication. However, it is preferred that a public database of identifiers is maintained via which a message recipient can be queried 278 and identified and contacted. In one scenario, a message recipient may sign up for an account for publication of the identifier, for which the identifier may be a pseudonym—or even a name if desired. The serial number may be used as the common identifier, or may be retained by the system for correlation with another common identifier. When a message sender posts information to the system for a potential recipient, the system locates the account of the recipient and posts the encrypted message to the recipient's account. Alternatively, the encrypted message could be sent and presented in some other form, such as through an email service. The recipient may download the message at his convenience, or a predetermined qualifier (such as an expiry time) may be placed on the message. The user retrieves messages specific to their implementing device's serial number. Total anonymity is achieved by performing the encryption off-line; that is, the message is completely encrypted prior to being received by a service rendering it unrecoverable by the operator of the service. This can further be achieved by performing the public key encryption step with an ephemeral key, or rather, a randomly generated public/private key pair, on a disconnected device (i.e. —one not connected to any network) or via a completely client-side browser-based application or smart phone application. By utilizing both a unique encryption key pair as well as a unique decryption key pair to create a shared key, one achieves perfect forward secrecy—the inability to recover all originally transmitted messages in the future if a single key is compromised.

Color sensing devices often rely on a dedicated array of photo-sensitive elements logically acting as a single unit. However, as shown by FIGS. 1, 6, 13, 18 and 19 the present invention may oversample 286 incoming color sequences at a rate greater than the capabilities of the sensor array acting unitarily, making the present invention seemingly inapplicable to devices with traditional color reception arrays, e.g. cameras, including smartphone cameras. The traditional sensor array 120 of a digital camera (video or otherwise) is composed of many sensor constituents 122. A sensor used in a digital camera comprises a 2-D array of many photo-sensitive elements or cells. An analog-to-digital converter turns each pixel's value into a digital count value. Some (if not most) sensor arrays may be configured to capture images in a way that does not capture the entire sensor array simultaneously, but rather captures different parts of the sensor at different points in time. Sensors may either be activated, e.g. in a rolling shutter technique, or obscured to create the cascading effect of the present invention. For example, the movement of a linear aperture may reveal the desired sensor constituents, the aperture sliding from top to bottom (or bottom to top, or right to left, or left to right) in order to expose the sensor constituents.

For purposes of this disclosure the reception rate of the sensor in its unitary state will be referred to as "native reception rate" while the reception rate of the sensor during constituent cascading will be referred to as the "cascade rate." The cascade rate is the rate at which a directed subgroup of sensor constituents enact a reading, while the reception rate is the rate at which all constituents, acting unitarily, enact a reading. Oversampling color sequences of a color stream transmission permits reconstruction of the signal with higher temporal fidelity, which ultimately correlates to higher decoding accuracy in the presence of noise or other signal impairment artifacts. Furthermore, the implementation of sensor cascading permits the use of the present invention with sensors having a native reception rate too slow to effectively oversample a color stream transmission in order to reconstruct the signal with sufficient temporal fidelity. For example, the built-in video camera of an ordinary smart device (a phone, tablet, etc.) is usually able to record video at 20-30 frames per second or higher (some newer devices are capable of 60 fps video).

Unfortunately, 20-30 frames per second as a recording frame rate is not high enough by itself to accurately reconstruct a transmitted color sequence as it does not satisfy the Nyquist-Shannon sampling theorem (assuming the transmitting frame rate is greater than or equal to half of the native reception rate). That is, if we consider a modest color stream transmission rate of 20 frames per second, the theorem states that we must sample the signal at a rate at least twice the fundamental frequency of the transmission to reconstruct the signal (at least 40 Hz in this case). In practice, the sampling rate needs to be much higher than 2× to accommodate signal variations and noise using current methods. Also of note, it is possible to under-sample the color stream transmission over a much longer period of time in order to reconstruct the signal at a higher temporal fidelity using a very low sampling rate (on the order of 1-60 Hz or so). This technique essentially captures the "alias" of the signal over a longer period of time.

Applicant's investigations have experimentally used a sampling rate of 240-360 Hz (approximately 8-12× oversampling) with good success. What is needed is a way to extract higher frequency signal components out of an integrated video camera only able to record at 24-30 fps.

Figure 19:
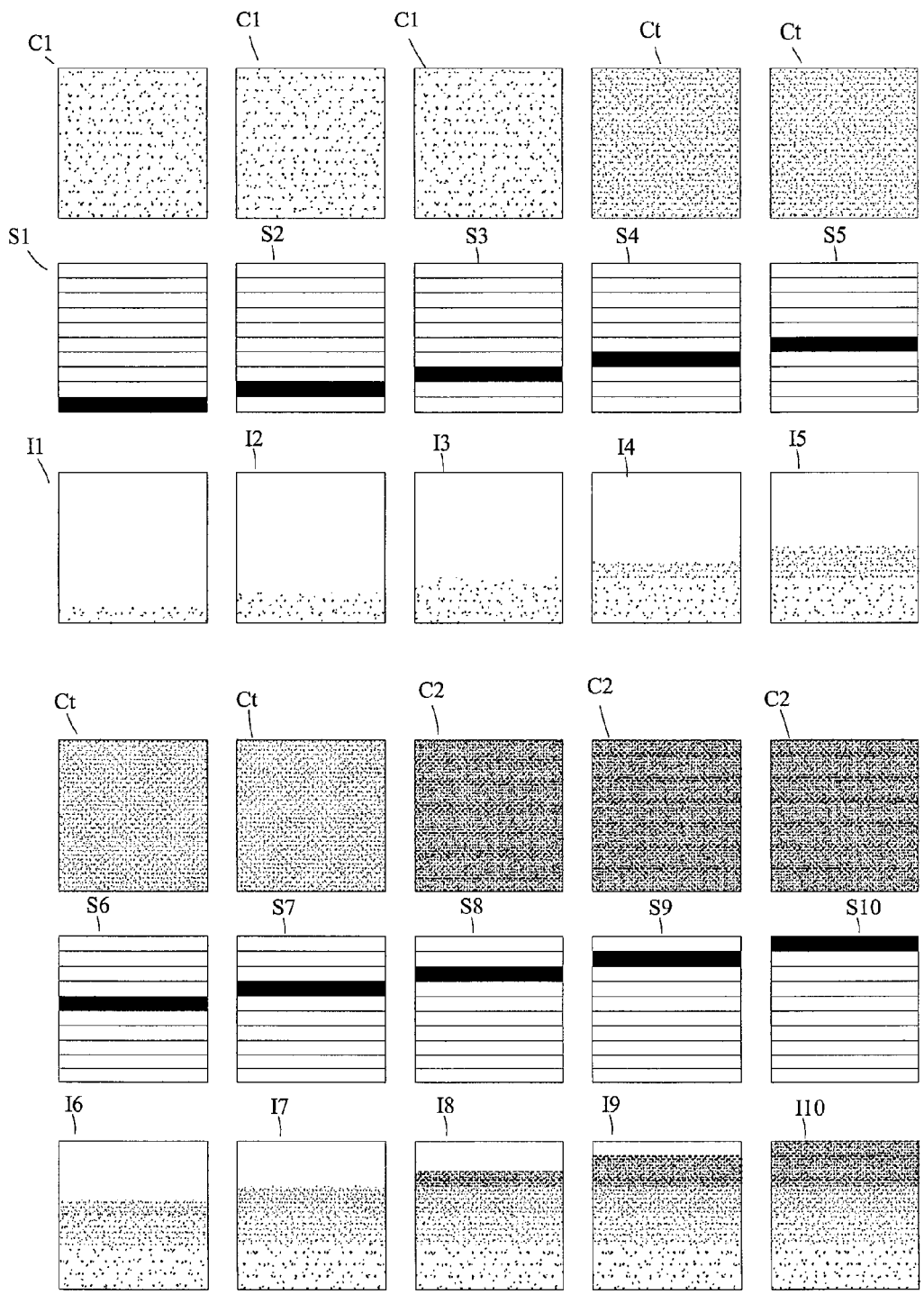
FIG. 19 is a view of a preferred linear aperture "cascade" capture step of the present invention.

As shown in greater detail in FIG. 19, by cascading sensor constituents linearly, or alternatively in other logical subgroups, the entire frame of video is not captured all at once (i.e.—a snapshot of the entire scene at a single instant in time), but rather each frame of video is captured by scanning across the scene line-by-line very rapidly in either the vertical or horizontal direction. The line scanning rate must be high enough to achieve complete frame capture at normal video frame rates of 24-30+ frames per second. FIG. 19 depicts a simplified progression of the cascading sensor constituents by row in a 10×10 sensor array S1-S10 (1-10, corresponding to the ten states of the sensor array during the cascade) capturing the change from COLOR 1, C1, to COLOR 2, C2, and the intermediate colors there between (Ct). The resulting image is shown as I1-I10. The sensor array during the cascade captures in the active row only the color present at the time of the capture. A single fully-readout image still shows an abbreviated history of the color change. A drawback of an image with non-uniform color schemes bearing the results of ultrafast color stream capture is the inherent inability to differentiate between colors in a sequence, e.g. C1 and C2, and transition colors, Ct. This drawback may be overcome by statistically sampling the area occupied by a color value, and utilizing differential algorithms to locate minima and maxima corresponding to color shifts.

Consider an example of an integrated video camera having a sensor of 640 (horizontal)×480 (vertical) pixels using a horizontal (top-to-bottom) cascading capture method and recording video at 30 frames per second. In this example, each line within each frame of video consists of 640 individual pixels, and each line would be sampled at 30 fps×480 lines=14,400 lines per second (or Hz). Now consider an integrated video camera recording a scene of a transmitted color sequence at 20 Hz (using the above example parameters), with the transmitted color sequence occupying at least ¼ of each captured video frame. If we use the individual cascaded scan lines of each video frame to derive the samples of the transmitted color sequence, we can effectively oversample the transmitted signal at a rate of 14,400 lines per second*¼ of a frame=3,600× oversampling—well over the 2× (40 Hz) oversampling rate requirement dictated by Nyquist-Shannon and well over the practical oversampling rate requirement of 8-12× (160-240 Hz). Sampling and decoding accuracy could also be increased by implementing a suitable video region tracking system; that is, the ability to track the location of the transmitted color stream within the received video frames.

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

What is claimed is:

1. A light-based communication method for the color-coded transmission of a message, said method comprising the steps of:
    initializing a light-emission transmitter, with a transmitter arithmetic logic unit ("ALU") and a transmitter non-transitory computer-readable storage medium, for transmitting a color stream transmission comprising data converted into original code color triplets selected from stock code color triplets within a predefined color gamut;
    transmitting from said transmitter said color stream transmission;
    receiving said color stream transmission on a distinct receiver, with a receiver ALU and a receiver nontransitory computer-readable storage medium, positioned proximate to said transmitter with a sensor, having a geometric sensor having a regular two-dimensional array of sensor constituents, adapted to interpret color flashes as received color triplets;
    oversampling said color stream transmission beyond a native reception rate of said sensor by linearly cascading reception of said sensor constituents at a cascade rate at least double said native reception rate resulting in an oversampled series of received code colors;
    approximating said original code color triplets from said oversampled, received code colors resulting in an approximated code colors series; and
    extracting said data from said approximated code colors series.

2. The method of claim 1 wherein said oversampling step includes oversampling said received code colors at said cascade rate of at least 100× said native reception rate.

3. The method of claim 2 wherein said oversampling step includes oversampling said received code colors at said cascade rate of at least 1,000× said native reception rate.

4. The method of claim 3 wherein said oversampling step includes oversampling said received code colors at said cascade rate of at least 10,000× said native reception rate.

5. The method of claim 3 wherein said oversampling step includes oversampling said received code colors at said cascade rate of at least 1,000,000× said native reception rate.

6. A light-based communication system for the color-coded transmission of a message, said system comprising:
    a light-emission transmitter, with a transmitter arithmetic logic unit ("ALU") and a transmitter nontransitory computer-readable storage medium, for transmitting a color stream transmission comprising data converted into original code color triplets selected from stock code color triplets within a predefined color gamut; and
    a receiver, a receiver ALU, and a receiver nontransitory computer-readable storage medium, for receiving said color stream transmission when positioned proximate to said transmitter, having a geometric sensor having a regular two-dimensional array of sensor constituents, adapted to interpret color flashes as received color triplets; wherein said receiver is adapted to:
        oversample said color stream transmission beyond a native reception rate of said sensor by linearly cascading reception of said sensor constituents at a cascade rate at least double said native reception rate resulting in an oversampled series of received code colors;
        approximate said original code color triplets from said oversampled, received code colors resulting in an approximated code colors series; and
        extract said data from said approximated code colors series.

7. The system of claim 6 wherein said receiver is adapted to oversample said received code colors at said cascade rate of at least 100× said native reception rate.

8. The method of claim 7 wherein said receiver is adapted to oversample said received code colors at said cascade rate of at least 1,000× said native reception rate.

9. The method of claim 8 wherein said receiver is adapted to oversample said received code colors at said cascade rate of at least 10,000× said native reception rate.

10. The method of claim 9 wherein said receiver is adapted to oversample said received code colors at said cascade rate of at least 1,000,000× said native reception rate.

* * * * *